United States Patent
Watanabe et al.

(10) Patent No.: US 6,762,107 B2
(45) Date of Patent: Jul. 13, 2004

(54) CAPACITOR AND MANUFACTURING METHOD THEREOF

(75) Inventors: Hisayoshi Watanabe, Matsue (JP); Takashi Imanaka, Kadoma (JP); Toru Uchida, Matsue (JP); Osamu Sengoku, Matsue (JP); Shinsuke Itoi, Matsue (JP); Munekazu Nishihara, Neyagawa (JP); Takaaki Higashida, Kadoma (JP); Daisuke Suetsugu, Uji (JP); Kenichi Yamamoto, Moriguchi (JP); Jun Katsube, Matsue (JP); Hirotaka Hisamura, Matsue (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/311,999

(22) PCT Filed: Apr. 18, 2002

(86) PCT No.: PCT/JP02/03891

§ 371 (c)(1),
(2), (4) Date: Dec. 23, 2002

(87) PCT Pub. No.: WO02/089161

PCT Pub. Date: Nov. 7, 2002

(65) Prior Publication Data

US 2003/0139016 A1 Jul. 24, 2003

(30) Foreign Application Priority Data

Apr. 27, 2001 (JP) .................................. 2001-131445

(51) Int. Cl.$^7$ ................................................ H01L 21/20
(52) U.S. Cl. ....................................... 438/393; 257/532
(58) Field of Search .................................. 438/639–640, 438/393, 978; 257/532, 758, 774, 784

(56) References Cited

U.S. PATENT DOCUMENTS 6,573,584 B1 * 6/2003 Nagakari et al. ............ 257/528

FOREIGN PATENT DOCUMENTS

JP 11-97287 4/1999

* cited by examiner

Primary Examiner—David Nelms
Assistant Examiner—David Vu
(74) Attorney, Agent, or Firm—Parkhurst & Wendel, L.L.P.

(57) ABSTRACT

A capacitor (1) using a flexible substrate (2) includes a hole portion (6a) formed in a dielectric (6) to connect an upper electrode (7) to an external leader electrode (4). At least part of the hole portion (6a) extends from its lower end to upper end at an inclination between 0.1 and 20° with respect to a top surface of the external leader electrode (4). Then, an upper end corner of an inclined wall surface of the upper electrode (7), which inclines along the hole portion (6a) of the dielectric (6), has a downward inclination between 0.1 and 20°. A lower end corner of the inclined wall surface of the upper electrode (7), which inclines along the hole portion of the dielectric (6), has an upward inclination between 0.1 and 20°. As a result, stress concentration on the corners of the upper electrode (7) is drastically reduced to prevent the upper electrode (7) from cracking.

37 Claims, 19 Drawing Sheets

FIG. 24
PRIOR ART
(a) 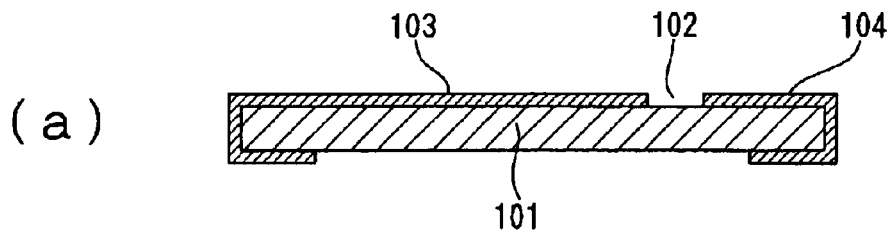
(b) 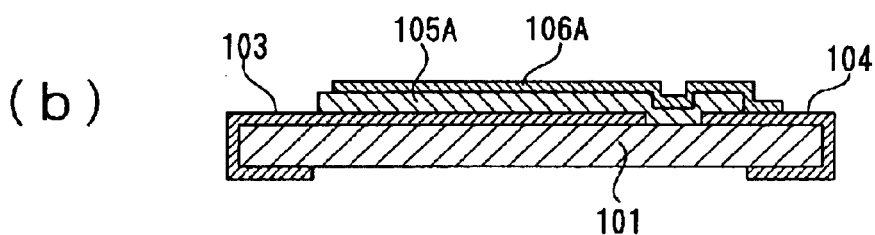
(c) 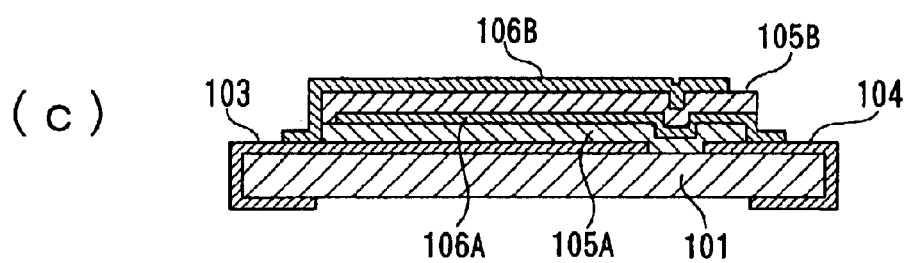
(d) 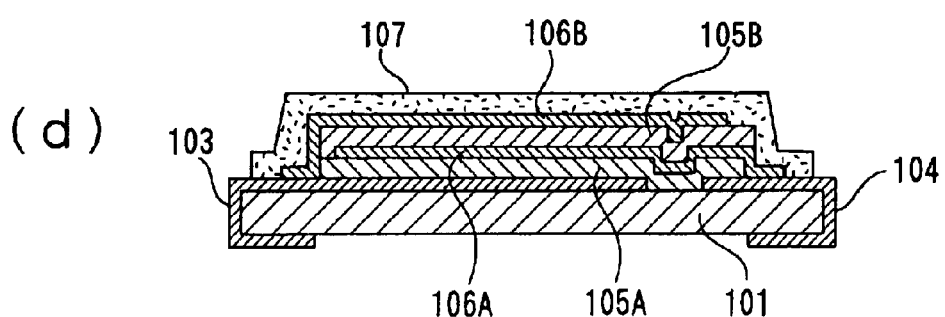

FIG. 25
PRIOR ART
(a) 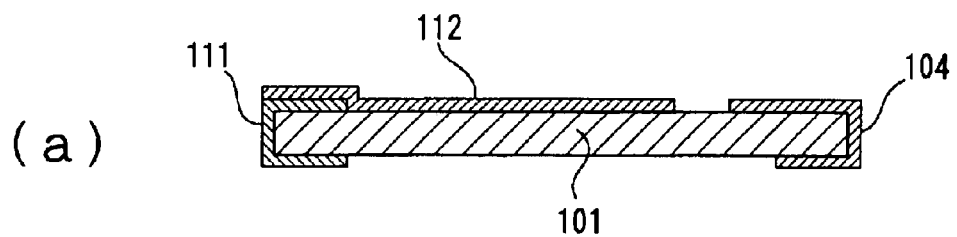
(b) 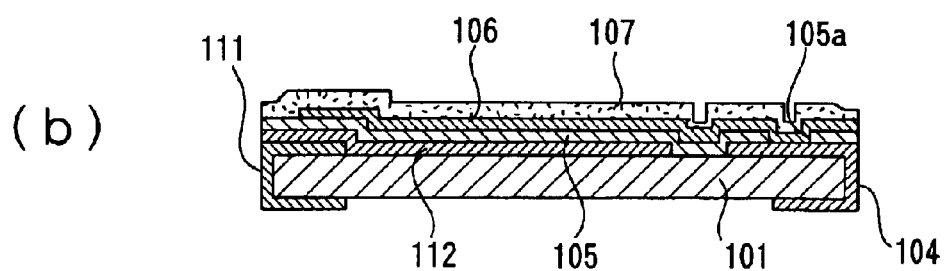

CAPACITOR AND MANUFACTURING METHOD THEREOF

TECHNICAL FIELD

The present invention relates to a capacitor and manufacturing method thereof.

BACKGROUND ART

Conventional small-sized capacitors are known in which an electrode section composed of a thin-film dielectric layer or a metal film is formed on a relatively rigid substrate such as ceramic or an epoxy resin. However, it is possible to reduce a thickness of the thin-film dielectric layer or electrode section of such a capacitor, whereas a substrate of this kind may be damaged or broken if its thickness is reduced below a certain value (e.g. 0.5 mm). Thus, there is a limit on a reduction in the thickness of such a capacitor. It has been difficult to use this capacitor in a product of thickness smaller than 1 mm.

To deal with this, a film-like flexible substrate has been provided which is composed of a very flexible organic resin substrate such as polyimide which has a thickness of 0.1 mm or smaller as disclosed in, for example, Japanese Patent Laid-Open No. 11-97287. Even if the flexible substrate is made thinner, a capacitor of this kind is not damaged or broken because the flexible substrate itself can be bent. Accordingly, the thickness of the substrate and thus of the entire capacitor can be reduced. Consequently, this capacitor can be used in an IC card of thickness about 1 mm or a thinner product.

A capacitor of this kind is manufactured, for example, as shown in FIGS. 23(a) to 23(c). First, as shown in FIG. 23(a), a lower electrode 103 and an external leader electrode 104 are formed so as to cover the opposite sides and top surface of a film-like very flexible substrate 101 and to have a gap 102 between themselves so that the electrodes 103 and 104 are not electrically connected together. Then, a dielectric 105 is formed on the top surfaces of the lower electrode 103 and the external leader electrode 104 so as to extend across these electrodes. Subsequently, as shown in FIG. 23(b), a hole 105a for a contact hole is formed through the dielectric 105 at a position corresponding to the external leader electrode 104. An upper electrode 106 is formed on the dielectric 105 including the hole 105a so as to electrically connect the upper electrode 106 and the external leader electrode 104 together. Subsequently, a protective layer 107 is formed at the top of these layers as required.

Thereby, as shown in FIG. 23(c), a capacitor is constructed in which the lower electrode 103 and the upper electrode 106 constitute a capacitance across the dielectric 105. In this case, a very thin capacitor can be constructed by using a thin flexible substrate 101 and thinning the lower electrode 103, the external leader electrode 104, the dielectric 105, the upper electrode 106, and others. Further, since the flexible substrate 101 is used, even if it is thin, the substrate is prevented from being disadvantageously damaged and broken.

Further, a capacitor having plural layers of dielectrics 105A and 105B and plural layers of upper electrodes 106A and 106B is manufactured, for example, as shown in FIGS. 24(a) to 24(d). First, as shown in FIG. 24(a), the lower electrode 103 and the external leader electrode 104 are formed so as to cover the opposite sides and top surface of the film-like very flexible substrate 101 and to have the gap 102 between themselves so that the electrodes 103 and 104 are not electrically connected together. Then, as shown in FIG. 24(b), a first dielectric 105A is formed on the top surface portions of the lower electrode 103 and the external leader electrode 104. Subsequently, a first upper electrode 106A is formed on the top surfaces of the first dielectric 105A and the external leader electrode 104. Further, a part of the first upper electrode 106A is formed so as to extend onto the external leader electrode 104 so that the first upper electrode is electrically connected to the external leader electrode 104. Then, as shown in FIG. 24(c), a second dielectric 100B is formed on the first upper electrode 106A. Furthermore, a second upper electrode 106B is formed on the second dielectric 105B. Further, a part of the second upper electrode 106B is formed so as to extend onto the lower electrode 103 so that the second upper electrode is electrically connected to the lower electrode 103. If more layers of dielectrics or upper electrodes are required, operations of forming these dielectrics or upper electrodes are repeated. Subsequently, the protective layer 107 is formed at the top of these layers as required.

Thus, as shown in FIG. 24(d), a capacitor is constructed in which the lower electrode 103 and the first and second upper electrodes 106A and 106B constitute a capacitance across the first and second dielectrics 105A and 105B. Also in this case, a very thin capacitor can be constructed by using the thin flexible substrate 101 and thinning the lower electrode 103, the external leader electrode 104, the dielectrics 105A and 105B, the upper electrodes 106A and 106B, and others.

Further, in another example, as shown in FIG. 25(a), a lower-electrode-connected external leader electrode 111 connected to the lower electrode 103 and an upper-electrode-connected external leader electrode 104 connected to the upper electrode 106 are formed so as to cover the opposite sides of the film-like flexible substrate 101. Then, a lower electrode 112 is formed so as to extend across the neighborhood of end surface portion of the lower-electrode-connected external leader electrode 111 and an external exposed surface of the flexible substrate 101. The lower electrode 112 is then connected to the lower-electrode-connected external leader electrode 111. Subsequently, as shown in FIG. 25(b), the dielectric 105 is formed on the top surfaces of the lower electrode 111 and the upper-electrode-connected external leader electrode 104 so as to extend across these electrodes. Then, the hole 105a is formed through the dielectric 105 at the position corresponding to the upper-electrode-connected external leader electrode 111. The upper electrode 106 is formed on the dielectric 105 including the hole 105a so as to electrically connect the upper electrode 106 and the external leader electrode 104 together. Subsequently, the protective layer 107 is formed at the top of these layers as required.

Thus, a capacitor is constructed in which the lower electrode 112 and the upper electrode 106 constitute a capacitance across the dielectric 105. Also in this case, a very thin capacitor can be constructed by using the thin flexible substrate 101 and thinning the lower-electrode-connected external leader electrode 111 and upper-electrode-connected external leader electrode 104, the lower electrode 112, the dielectric 105, the upper electrode 106, and others.

In this case, in a capacitor such as the one shown in FIG. 23, the wall surface of the hole portion 105a, formed in the dielectric 105, is formed substantially at a right angle (about 80 to 90°) to the flexible substrate 101 in order to connect the upper electrode 106 to the external leader electrode 104, as shown in the enlarged view of FIG. 26. Accordingly, corners 106a, 106b, 106c, and 106d of the upper electrode 106 formed along the hole portion 105a of the dielectric 105 are formed to be bent substantially at right angles.

Further, end surfaces of the lower electrode 103 and external leader electrode 104 which face each other via the gap 102 are formed substantially at right angles to the flexible substrate 101. Thus, the corners 105b, 105c, 105d, and 105e of the dielectric 105 and corners 106e, 106f, 106g, and 106h of the upper electrode 106, all of which are formed along the gap 102, are also formed to be bent substantially at right angles.

Further, in a capacitor such as the one shown in FIG. 24, end surfaces 105s and 105p of the first and second dielectrics 105A and 105B, respectively, are formed on the lower electrode 103 and the first upper electrode 106A so as to extend substantially at a right angle to these electrode, and are faced by downward extending portions 106i and 106j, respectively, extending downward from the first and second upper electrodes 106A and 106B to connect to the external leader electrode 104 and the lower electrode 103, as shown in the enlarged view of FIG. 27. Accordingly, corners 106k, 106m, 106n, and 106o of the upper and lower ends of the first and second upper electrodes 106A and 106B are formed to be bent substantially at right angles.

Further, in a capacitor such as the one shown in FIG. 25, an end surface 111a of the lower-electrode-connected external leader electrode 111 to which the lower electrode 112 is connected is formed substantially at a right angle to the flexible substrate 101, as shown in the enlarged view of FIG. 28. Corners 112a and 112b of the lower electrode 112 formed along the end surface 111a are formed to be bent substantially at right angles.

However, a capacitor using a flexible substrate 101 of this kind is advantageous in that its thickness can be significantly reduced, but it is likely to be deformed because of the use of the flexible substrate 101. Accordingly, if the capacitor undergoes relatively weak external stress (external force) when a thin product using this capacitor is vibrated or if stress is caused by a difference in expansion coefficient among the component materials in connection with temperature, then this stress is received by rigid metal material components. In particular, the stress may concentrate on the corners 106a to 106o, 112a, and 112b, bent at right angles, of the upper electrodes 106, 106A, and 106B and lower electrodes 103 and 112, all of which are thin.

If stress concentrates repeatedly on the upper electrodes 106, 106A, and 106B and the corners 112a and 112b of the lower electrode 112 to crack the capacitor, these cracks may develop to cut the capacitor or may narrow conductive portions. Consequently, when a relatively large current flows, the cracks may be widened to cut the capacitor. Further, in particular, if the upper electrodes 116, 116A, and 116B and the lower electrode 112 are formed by vapor deposition, then the corners 116a to 116o, 112a, 112b, and others tend to be thinner. As a result, this problem may become more serious.

DISCLOSURE OF THE INVENTION

To solve these problems, a capacitor as set forth in Aspect 1 of the present invention is characterized by comprising a flexible substrate, an upper-electrode-connected external leader electrode and a lower electrode formed on the flexible substrate with a gap between themselves so as not to be electrically connected together, a dielectric formed so as to extend across a top surface of the external leader electrode and a top surface of the lower electrode, and an upper electrode arranged opposite the lower electrode across the dielectric, and in that a hole portion is formed through the dielectric so as to incline from a side that faces a bottom surface of the upper electrode to a side that faces the top surface of the external leader electrode, in that an inclined wall surface of hole portion of the dielectric is at least partly provided with a portion extending from a lower end to an upper end of the inclined wall surface at an inclination between 0.1 and 20° with respect to the top surface of the external leader electrode, and in that the upper electrode is formed to be depressed while inclining along the inclined wall surface of hole portion of the dielectric to connect to the top surface of the external leader electrode.

The invention as set forth in Aspect 2 is the capacitor as set forth in Aspect 1, wherein the inclined wall surface of hole portion of the dielectric is provided with a portion inclined downward from its upper end corner at an angle between 0.1 and 20° and a portion inclined upward from its lower end corner at an angle between 0.1 and 20°.

The invention as set forth in Aspect 3 is the capacitor as set forth in claim 1 or 2, wherein the hole portion of the dielectric penetrates the dielectric in an inverted cone or pyramid form from a side that faces the upper electrode to a side that faces the external leader electrode.

The invention as set forth in Aspect 4 is the capacitor as set forth in any one of Aspects 1 to 3, wherein an inclined surface is formed on the upper electrode so as to incline along the inclined wall surface of hole portion of the dielectric, and the inclined surface of the upper electrode is at least partly provided with a portion extending from a lower end to a upper end of the inclined wall surface at an inclination between 0.1 and 20° with respect to the top surface of the external leader electrode.

The invention as set forth in Aspect 5 is the capacitor as set forth in Aspect 4, wherein the inclined surface of the upper electrode is provided with a portion inclined downward from its upper end corner at an angle between 0.1 and 20° and a portion inclined upward from its lower end corner at an angle between 0.1 and 20°.

With the arrangements as set forth in Aspect 1 to 5, the inclined wall surface of hole portion of the dielectric is at least partly provided with the portion extending from the lower end to upper end of the inclined wall surface at an inclination between 0.1 and 20° with respect to the top surface of the external leader electrode. Accordingly, an inclined surface of the upper electrode which faces this portion is inclined gently at an angle close to 0.1 to 20°. This reduces stress concentration on this portion to prevent cracking.

Further, according to the arrangements as set forth in Aspect 2 and 5, the upper end corner of the inclined wall surface of hole portion of the dielectric has a downward inclination between 0.1 and 20°, and the lower end corner of the inclined wall surface of hole portion of the dielectric also has an upward inclination between 0.1 to 20°. Accordingly, the upper end corner of inclined wall surface of the upper electrode, which inclines along the hole portion of the dielectric, is gently inclined downward. Likewise, the lower end corner of inclined wall surface of the upper electrode, which inclines along the hole portion of the dielectric, is gently inclined upward. This reduces stress concentration on the above corners of the upper electrode to prevent the upper electrode from cracking.

A method of manufacturing a capacitor according to Aspect 6 of the present invention is characterized by comprising an external leader electrode and lower electrode forming step of forming an upper-electrode-connected external leader electrode and a lover electrode on a flexible substrate with a gap between themselves so that the electrodes viii not be electrically connected together, a dielectric forming step of forming a dielectric so as to extend across a top surface of the external leader electrode and a top surface of the lower electrode, and a hole portion forming step of forming a hole portion through the dielectric at a position corresponding to the external leader electrode so that a wall surface of the hole portion at least partly inclines, the inclined wall surface being at least partly provided with a portion extending from its lower end to upper end at an inclination between 0.1 and 20° with respect to the top surface of the external leader electrode, and an upper electrode forming step of forming an upper electrode on the dielectric including the hole portion to electrically connect the upper electrode to the external leader electrode.

This method allows the capacitor as set forth in Aspect 1 to be manufactured appropriately.

The invention as set forth in Aspect 7 is the capacitor manufacturing method according to Aspect 6, wherein at the hole portion forming step, the hole portion is formed in the dielectric by allowing a plasma stream to pass through a hole in mask spaced at a predetermined distance from the dielectric.

The invention as set forth in Aspect 8 is the capacitor manufacturing method according to Aspect 6 or 7, wherein at the hole portion forming step; a spacer is interposed between the mask and the dielectric.

The invention as set forth in Aspect 9 is the capacitor manufacturing method according to Aspect 7, wherein at the hole portion forming step, the hole portion is formed in the dielectric by allowing a plasma stream to pass through the hole in the mask while moving the mask.

According to the capacitor manufacturing method as set forth in Aspects 7 to 9, the hole portion can be formed appropriately in the dielectric so as to be at least partly provided with the portion extending from the lower end to upper end of the dielectric at an inclination between 0.1 and 20° with respect to the top surface of the external leader electrode.

A capacitor as set forth in Aspect 10 of the present invention is characterized by comprising a flexible substrate, an upper-electrode-connected external leader electrode and a lower electrode formed on the flexible substrate with a gap between themselves so as not to be electrically connected together, a dielectric formed so as to extend across a top surface of the external leader electrode and a top surface of the lower electrode, and an upper electrode arranged opposite the lower electrode across the dielectric, and in that a wall surface of the dielectric which is located above the external leader electrode is at least partly formed so as to incline downward from a side that faces a bottom surface of the upper electrode to a side that faces a top surface of the external leader electrode, in that the inclined wall surface of the dielectric is at least partly provided with a portion extending from a lower end to an upper end of the inclined wall surface at an inclination between 0.1 and 20° with respect to the top surface of the external leader electrode, and in that the upper electrode is formed to incline along the inclined wall surface of the dielectric so that its lover end is connected to the top surface of the external leader electrode.

The invention as set forth in Aspect 11 is the capacitor set forth in Aspect 10, wherein the inclined wall surface of the dielectric is provided with a portion inclined downward from its upper end corner at an angle between 0.1 and 20° and a portion inclined upward from its lower end corner at an angle between 0.1 and 20°.

The invention as set forth in Aspect 12 is the capacitor as set forth in claim 10 or 11, wherein an inclined surface is formed on the upper electrode so as to incline along the inclined surface of the dielectric, and the inclined surface of the upper electrode is at least partly provided with a portion extending from a lower end to an upper end of the inclined surface at an inclination between 0.1 and 20° with respect to the top surface of the external leader electrode.

The invention as set forth in Aspect 13 is the capacitor as set forth in Aspect 12, wherein the inclined surface of the upper electrode is provided with a portion inclined downward from its upper end corner at an angle between 0.1 and 20° and a portion inclined upward from its lover end corner at an angle between 0.1 and 20°.

With the arrangements as set forth in Aspects 10 to 13, the inclined wall surface of the dielectric is at least partly provided with the portion extending from the lower end to upper end of the inclined wall surface at an inclination between 0.1 and 20° with respect to the top surface of the external leader electrode. Further, the upper electrode is formed to incline along the inclined wall surface of the dielectric so that its lower end is connected to the top surface of the external leader electrode. Accordingly, the inclined surface of the upper electrode which corresponds to the gently inclined portion of the dielectric is inclined gently at an angle close to 0.1 to 20°. This reduces stress concentration on the inclined surface and corners of the upper electrode to prevent the upper electrode from cracking.

Further, according to the arrangements as set forth in Aspects 11 and 13, the dielectric is at least partly provided with the portion inclined downward from its upper end corner of inclined wall surface of a hole portion at an angle between 0.1 and 20° and the portion inclined upward from its lower end corner of inclined wall surface of a hole portion at an angle between 0.1 and 20°. In this portion, the upper end corner of inclined wall surface of the upper electrode which inclines along the inclined wall surface of the dielectric is gently inclined downward. Likewise, the lower end corner of inclined wall surf ace of the upper electrode which inclines along the hole portion of the dielectric is gently inclined upward. This reduces stress concentration on the above corners of the upper electrode to prevent the upper electrode from cracking.

A method of manufacturing a capacitor according to Aspect 14 of the present invention is characterized by comprising an external leader electrode and lower electrode forming step of forming an upper-electrode-connected external leader electrode and a lower electrode on a flexible substrate with a gap between themselves so that the electrodes will not be electrically connected together, a dielectric forming step of forming a dielectric so as to extend across a top surface of the external leader electrode and a top surface of the lower electrode, and an inclined wall surface forming step of forming an inclined wall surface on the dielectric at a position corresponding to the external leader electrode, the inclined wall surface being at least partly provided with a portion extending from a lower end to an upper end of the inclined wall surface at an inclination between 0.1 and 20° with respect to the top surface of the external leader electrode, and an upper electrode forming step of forming an upper electrode on the dielectric including the inclined wall surface and electrically connecting the upper electrode and the external leader electrode together.

This method allows the capacitor set forth in Aspects 10 to 13 to be manufactured appropriately.

A capacitor as set forth in Aspect 15 of the present invention is characterized by comprising a flexible substrate, an upper-electrode-connected external leader electrode and a lower electrode formed on the flexible substrate with a gap between themselves so as not to be electrically connected together, and a plurality of upper electrodes formed above the lower electrode via respective dielectrics as a plurality of layers and each connected to the external leader electrode or the lower electrode via an inclined downward extending portion extending to the external leader electrode or the lower electrode and via a connecting section, and in that that wall surface of the dielectric located immediately below each upper electrode which faces the inclined downward extending portion is formed to incline downward from a side that faces a bottom surface of the upper electrode to a side that faces a top surface of the external leader electrode or the lower electrode, and in that the inclined wall surface of each of the dielectrics is at least partly provided with a portion extending from a lower end to an upper end of the inclined wall surface at an inclination between 0.1 and 20° with respect to the top surfaces of the external leader electrode and the lower electrode.

The present invention as set forth in Aspect 16 is the capacitor as set forth in Aspect 15, wherein the inclined wall surface of each dielectric is at least partly provided with a portion inclined downward from its upper end corner at an angle between 0.1 and 20° and a portion inclined upward from its lower end corner at an angle between 0.1 and 20°.

The invention as set forth in Aspect 17 is the capacitor as set forth in claim 15 or 16, wherein the inclined downward extending portion of each upper electrode is at least partly provided with a portion extending from a lower end to an upper end of the inclined downward extending portion at an inclination between 0.1 and 20° with respect to the top surfaces of the external leader electrode and the lower electrode.

The invention as set forth in Aspect 18 is the capacitor set forth in Aspect 17, wherein the inclined downward extending portion of each upper electrode is provided with a portion inclined downward from its upper end corner at an angle between 0.1 and 20° and a portion inclined upward from its lower end corner at an angle between 0.1 and 20°.

According to the arrangements as set forth in Aspects 15 to 18, the inclined wall surface of each of the dielectrics is at least partly provided with the portion extending from the lower end to upper end of the inclined wall surface at an inclination between 0.1 and 20° with respect to the top surfaces of the external leader electrode and the lower electrode. Accordingly, the inclined surface of the upper electrode which corresponds to the gently inclined portion of each dielectric is also inclined gently at an angle between 0.1 and 20°. This reduces stress concentration on the inclined surface and corners of the upper electrode to prevent the upper electrode from cracking.

Further, according to the arrangements am set forth in Aspects 16 and 18, the inclined wall surface of each dielectric is at least partly provided with the portion inclined downward from its upper end corner at an angle between 0.1 and 20° and the portion inclined upward from its lower end corner at an angle between 0.1 and 20°. In this portion, the upper end corner of inclined wall surface of the upper electrode, inclining along the inclined wall surface of the dielectric, is gently inclined downward. Likewise, the lower end corner of inclined wall surface of the upper electrode, inclining along the inclined wall surface of the dielectric, is gently inclined upward. This reduces stress concentration on the above corners of the upper electrode to prevent the upper electrode from cracking.

A method of manufacturing a capacitor according to Aspect 19 is characterized by comprising an external leader electrode and lower electrode forming step of forming an upper-electrode-connected external leader electrode and a lover electrode on a flexible substrate with a gap between themselves so that the electrodes will not be electrically connected together, a dielectric and upper electrode forming step of forming a plurality of upper electrodes above the lower electrode via respective dielectrics as a plurality of layers and connecting each of the upper electrodes to the external leader electrode or the lower electrode via an inclined downward extending portion extending to the external leader electrode or the lower electrode and via a connecting section, and in that at the dielectric and upper electrode forming step, an inclined wall surface of the dielectric is formed so that that wall surface of the dielectric located immediately below each upper electrode which faces the inclined downward extending portion inclines downward from a side that faces a bottom surface of the upper electrode to a side that faces a top surface of the external leader electrode or the lover electrode and so that the inclined wall surface of each of the dielectrics is at least partly provided with a portion extending from a lower end to an upper end of the inclined wall surface at an inclination between 0.1 and 20° with respect to the top surfaces of the external leader electrode and the lower electrode.

This method allows the capacitor as set forth in Aspects 15 to 18 to be manufactured appropriately.

The invention as set forth in Aspect 20 is the capacitor manufacturing method according to Aspect 14 or 19, wherein at the step of forming the inclined wall surface of the dielectric, sputtering is carried out with a predetermined space provided between the mask and the dielectric.

The invention as set forth in Aspect 21 is the capacitor manufacturing method according to Aspect 20, wherein at the step of forming the inclined end wall surface of the dielectric, a spacer is interposed between the mask and the dielectric.

The invention as set forth in Aspect 22 is the capacitor manufacturing method according to Aspect 20, wherein at the step of forming the inclined end wall surface of the dielectric, sputtering is carried out while moving the mask.

According to the capacitor manufacturing method as set forth in Aspects 20 to 22, the inclined end wall surface can be formed appropriately in the dielectric so as to be at least partly provided with the portion extending from the lower end to upper end of the inclined surf ace of the dielectric at an inclination between 0.1 and 20° with respect to the top surface of the external leader electrode.

A capacitor as set forth in Aspect 23 of the present invention is characterized by comprising a flexible substrate, an upper-electrode-connected external leader electrode and a lower electrode formed on the flexible substrate with a gap between themselves so as not to be electrically connected together, a dielectric formed so as to extend across a top surface of the external leader electrode and a top surface of the lower electrode, an upper electrode arranged opposite the lower electrode across the dielectric and electrically connected to the external leader electrode, and an insulator that fills the gap between the external leader electrode and the lover electrode, and in that the dielectric is formed to also cover the insulator.

The invention as set forth in Aspect 24 is the capacitor as set forth in Aspect 23, wherein of layers formed over the insulator filling the gap between the external leader electrode and the lower electrode, portions that contact with the top surfaces of the external leader electrode and lower electrode at least partly have an inclination of ±20°.

According to the arrangements as set forth in Aspects 23 and 24, the insulator fills the gap between the lower electrode and the external leader electrode. Accordingly, no corners are created in areas of the dielectric and upper electrode which correspond to the gap, or the corners are gently inclined. This eliminates or reduces stress concentration on the corners to prevent the upper electrode from cracking.

A method of manufacturing a capacitor according to Aspect 25 of the present invention is characterized by comprising an external leader electrode and lower electrode forming step of forming an upper-electrode-connected external leader electrode and a lower electrode on a flexible substrate with a gap between themselves so that the electrodes will not be electrically connected together, a gap filling step of using an insulator to fill a gap between the external leader electrode and the lover electrode, a dielectric forming step of forming a dielectric so as to extend across a top surface of the external leader electrode and a top surface of the lower electrode and across a top surface of the insulator, and an upper electrode forming step of forming an upper electrode on the dielectric and electrically connecting the upper electrode to the external leader electrode.

This method allows the capacitor as set forth in Aspects 23 and 24 to be manufactured appropriately.

A capacitor as set forth in Aspect 26 of the present invention is characterized by comprising a flexible substrate, an upper-electrode-connected external leader electrode and a lower electrode formed on the flexible substrate with a gap between themselves so as not to be electrically connected together, a dielectric formed so as to extend across a top surface of the external leader electrode and a top surface of the lower electrode, and an upper electrode arranged opposite the lower electrode across the dielectric and electrically connected to the external leader electrode, and in that each end surface facing the gap between the external leader electrode and the lower electrode is formed to incline relative to a top surface of the flexible substrate, in that an inclined end surface of the external leader electrode and an inclined end surface of the lower electrode are each at least partly provided with a portion extending from a lower end to an upper end of the inclined end surface at an inclination between 0.1 and 20° with respect to the top surface of the flexible substrate, and in that a dielectric and the upper electrode are formed along the inclined end surfaces of the external loader electrode and the lower electrode.

According to this arrangement, each end surface facing the gap between the external leader electrode and the lower electrode is formed to incline relative to the top surface of the flexible substrate. Further, the inclined end surface of the external leader electrode and the inclined end surface of the lower electrode are each at least partly provided with the portion extending from the lower end to upper end of the inclined end surface at an inclination between 0.1 and 20° with respect to the top surface of the flexible substrate. Furthermore, the dielectric and the upper electrode are formed along the inclined end surfaces of the external leader electrode and lower electrode. Accordingly, the corner of the dielectric corresponding to the gap and the corner of the upper electrode disposed over the gap are inclined gently. This reduces stress concentration on the corners to prevent the upper electrode from cracking.

A method of manufacturing a capacitor according to Aspect 27 of the present invention is characterized by comprising an external leader electrode and lower electrode forming step of forming an upper-electrode-connected external leader electrode and a lower electrode on a flexible substrate with a gap between themselves so that the electrodes will not be electrically connected together, a dielectric forming step of forming a dielectric so as to extend across a top surface of the external leader electrode and a top surface of the lower electrode, and an upper electrode forming step of forming an upper electrode on the dielectric and electrically connecting the upper electrode to the external leader electrode, and in that at the external leader electrode and lower electrode forming step, each end surface facing the gap between the external leader electrode and the lower electrode is formed to incline relative to a top surface of the flexible substrate, in that in this case, an inclined end surface of the external leader electrode and an inclined end surface of the lower electrode are each at least partly provided with a portion extending from a lower end to an upper end of the inclined end surface at an inclination between 0.1 and 20° with respect to the top surface of the flexible substrate, and in that the dielectric and the upper electrode are formed along the inclined end surfaces of the external leader electrode and the lower electrode.

This method allows the capacitor as set forth in Aspect 26 to be manufactured appropriately.

A capacitor as set forth in Aspect 28 of the present invention is characterized by comprising a flexible substrate, an upper-electrode-connected external leader electrode and a lower electrode formed on the flexible substrate with a gap between themselves so as not to be electrically connected together, insulators filled into two respective corners so that their wall surfaces are inclined, each of the two corners being located between an end surface portion of the external leader electrode or lower electrode which faces the gap and an area of the flexible substrate which is close to the end surface portion, each of the insulators being at least partly provided with a portion extending from a lower end to an upper end of an inclined surface of the insulator and having an inclination between 0.1 and 20° with respect to a top surface of the flexible substrate and an inclination of ±20° with respect to top surfaces of the external leader electrode and the lower electrode, a dielectric formed so as to extend across the top surfaces of the external leader electrode and the lover electrode and across the inclined surfaces of the insulators, and an upper electrode arranged opposite the lower electrode across the dielectric and electrically connected to the external leader electrode.

According to this arrangement, the insulators are filled into the two respective corners so that their wall surfaces are inclined, each of the two corners being located between the end surface portion of the external leader electrode or lower electrode which faces the gap and the area of the flexible substrate which is close to the end surface portion. Further, each of the insulators is at least partly provided with the portion extending from the lower end to upper end of the inclined surface of the insulator and having an inclination between 0.1 and 20° with respect to a top surface of the flexible substrate and an inclination of ±20° from top surfaces of the external leader electrode and lower electrode. Accordingly, the corner of the dielectric corresponding to the gap and the corner of the upper electrode disposed over the gap are inclined gently. This reduces stress concentration on the corners to prevent the upper electrode from cracking.

A method of manufacturing a capacitor according to Aspect 29 of the present invention is characterized by comprising an external leader electrode and lower electrode forming step of forming an upper-electrode-connected external leader electrode and a lower electrode on a flexible substrate with a gap between themselves so that the electrodes will not be electrically connected together, an insulator filling step of filling insulators into two respective corners so that their wall surfaces are inclined, each of the two corners being located between an end surface portion of the external leader electrode or lower electrode which faces the gap and an area of the flexible substrate which is close to the end surface portion, the insulator being at least partly provided with a portion extending from a lower end to an upper end of an inclined surface of the insulator and having an inclination between 0.1 and 20° with respect to a top surface of the flexible substrate and an inclination of ±20° with respect to top surfaces of the external leader electrode and lower electrode, a dielectric forming step of forming a dielectric so as to extend across the top surfaces of the external leader electrode and the lower electrode and across the inclined surfaces of the insulators, and an upper electrode forming step of forming an upper electrode on the dielectric and electrically connecting the upper electrode to the external leader electrode.

This method allows the capacitor as set forth in Aspect 28 to be manufactured appropriately.

A capacitor as set forth in Aspect 30 of the present invention is characterized by comprising a flexible substrate, a lower-electrode-connected external leader electrode formed on the flexible substrate, an upper-electrode-connected external leader electrode formed on the flexible substrate, an insulator filled into a corner of the flexible substrate which faces an end surface portion of the lower-electrode-connected external leader electrode, the insulator being at least partly provided with a portion extending from a lower end to an upper end of an inclined surface of the insulator and having an inclination between 0.1 and 20° with respect to a top surface of the flexible substrate and an inclination of ±20° with respect to a top surface of the lower-electrode-connected external, leader electrode, a lower electrode formed so as to extend across a neighborhood of the end surface portion of the lower-electrode-connected external leader electrode, the inclined surface of the insulator, and an external exposed surface of the flexible substrate, a dielectric formed on the lower electrode, and an upper electrode arranged opposite the lover electrode across the dielectric and electrically connected to the upper-electrode-connected external leader electrode.

According to this arrangement, the insulator is filled into the corner of the flexible substrate which faces the end surface portion of the lover-electrode-connected external leader electrode, the insulator being at least partly provided with the portion extending from the lover end to upper end of the inclined surface of the insulator and having an inclination between 0.1 and 20° with respect to the flexible substrate and an inclination of ±200 with respect to the top surface of the lower-electrode-connected external leader electrode. Accordingly, the corner of the lover electrode corresponding to the gap is inclined gently. This reduces stress concentration on the corners to prevent the lover electrode from cracking.

A method of manufacturing a capacitor according to Aspect 31 is characterized by comprising a lover-electrode-connected external leader electrode forming step of forming a lower-electrode-connected external leader electrode on a flexible substrate, an upper-electrode-connected external leader electrode forming step of forming an upper-electrode-connected external leader electrode on the flexible substrate, an insulator forming step of forming an insulator in a corner between an end surface portion of the lower-electrode-connected external leader electrode and an area of the flexible substrate which is close to the end surface portion, the insulator being formed so that its end surface is inclined at an angle between 0.1 and 20° with respect to the flexible substrate, an insulator forming step of filling an insulator into a corner of the flexible substrate which faces the end surface portion of the lower-electrode-connected external leader electrode, the insulator being at least partly provided with a portion extending from a lower end to an upper end of an inclined surface of the insulator and having an inclination between 0.1 and 20° with respect to a top surface of the flexible substrate and an inclination of ±20° with respect to a top surface of the lower-electrode-connected external leader electrode, a lover electrode forming step of forming a lower electrode so as to extend across a neighborhood of the end surface portion of the lower-electrode-connected external leader electrode, the inclined surface of the insulator, and an external exposed surface of the flexible substrate, a dielectric forming step of forming a dielectric on the lower electrode, and an upper electrode forming step of forming an upper electrode arranged opposite the lower electrode across the dielectric and electrically connected to the upper-electrode-connected external leader electrode.

This method allows the capacitor as set forth in Aspect 30 to be manufactured appropriately.

The invention as set forth in Aspect 32 is the capacitor as set forth in any of Aspect 23, 24, 28, and 30, wherein the insulator is a resin.

The invention as set forth in Aspect 33 is the capacitor as set forth in any of Aspects 1 to 5, 11 to 15, 21, 22, 24, 26, 28, and 29, wherein the dielectric is formed of a material selected from a group consisting of polyphenylene sulfide, silicon dioxide, divinylbenzene polymer, strontium titanate, syndiotactic polystyrene, cyclic olefin copolymer film, polyphenylene oxide, polybenzocyclobutene polymer, divilnaphthalene polymer, divinylbiphenyl polymer, aluminum oxide, and polyetheretherketone resin, and mixtures of any of these materials.

The invention as set forth in Aspect 34 is the capacitor as set forth in any of Aspects 1 to 5, 10 to 13, 15 to 18, 23, 24, 26, 28, 30, and 32, wherein the flexible substrate is a resin film.

The invention as set forth in Aspect 35 is the capacitor manufacturing method as set forth in any of Aspects 6 to 9, 14, 19 to 22, 25, 27, 29, and 31, wherein at the dielectric forming step, the dielectric is formed by sticking a film-like dielectric.

The invention as set forth in Aspect 36 is the capacitor manufacturing method as set forth in any of Aspects 6 to 9, 14, 19 to 22, 25, 27, 29, and 31, wherein at the dielectric forming step, the dielectric is formed by vapor deposition.

The invention as set forth in Aspect 37 is the capacitor manufacturing method as set forth in Aspect 8 or 21, wherein the spacer is formed of polyethylene terephthalate or polyethylene naphthalate or a mixture of these materials.

BRIEF DESCRIPTION OF THE DRAWINGS

FIGS. 24(a) to 24(d) are sectional views showing steps of manufacturing another conventional capacitor;

FIGS. 25(a) and 25(b) are sectional views showing steps of manufacturing yet another conventional capacitor;

PREFERRED EMBODIMENTS

Embodiment 1

The present invention will be described below with reference to the drawings.

Figure 1:
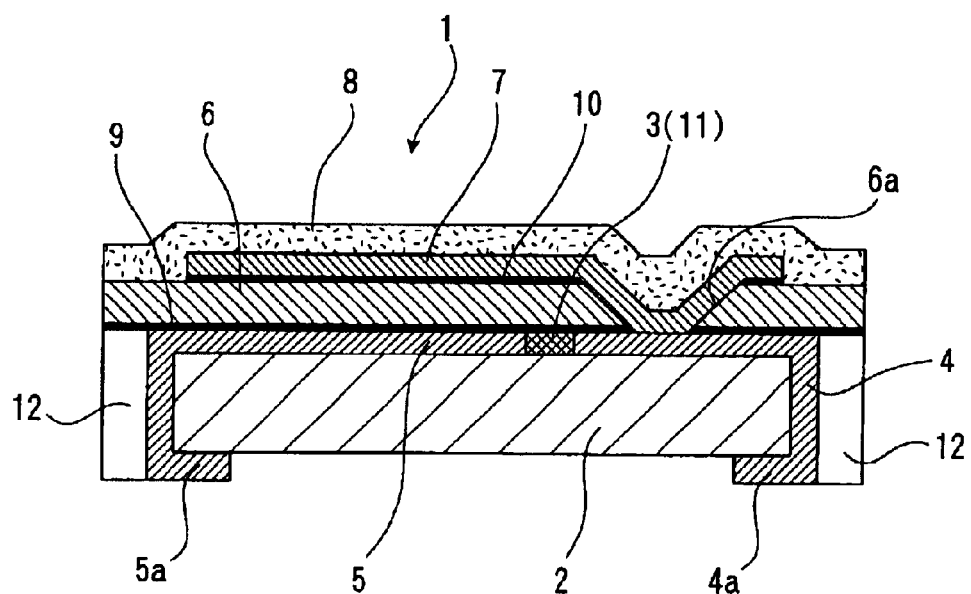
FIG. 1 is a sectional view of a capacitor according to first to third embodiments of the present invention.
Figure 2:
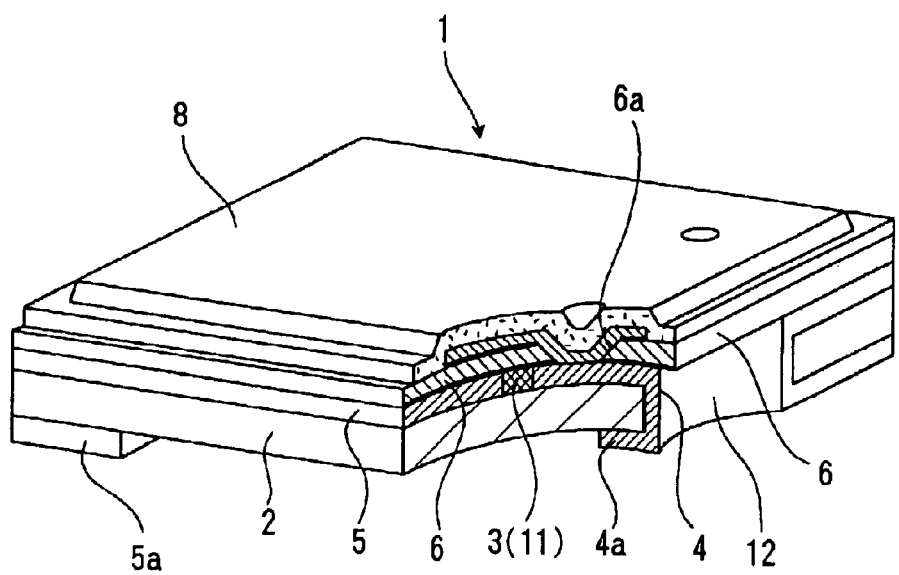
FIG. 2 is a partial cutout sectional perspective view of the capacitor in FIG. 1.
Figure 3:
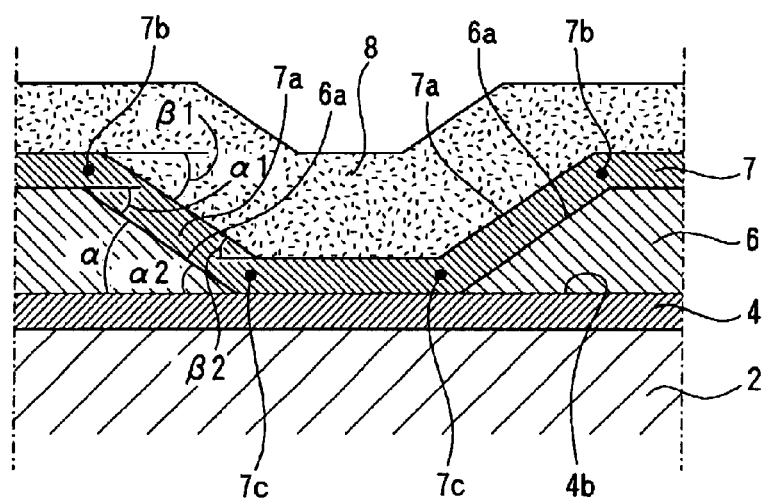
FIG. 3 is an enlarged sectional view of an essential part of the capacitor.
Figure 4:
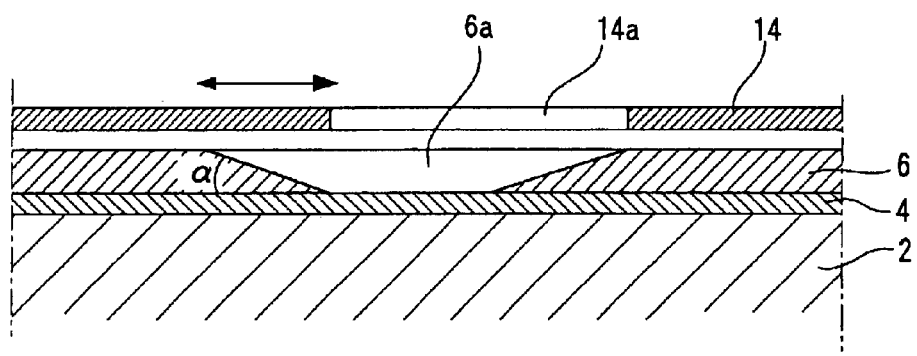
FIG. 4 is an enlarged sectional view showing how a hole portion is formed in a dielectric in a capacitor manufacturing method.

FIG. 1 is a sectional view of a capacitor according to a first embodiment of the present invention. FIG. 2 is a partial cutout sectional perspective view of the capacitor in FIG. 1. FIG. 3 is an enlarged sectional view of an essential part of the capacitor. FIG. 4 is an enlarged sectional view showing how a hole portion is formed in a dielectric. FIGS. 5(a) to 5(f) and 6(a) to 6(e) are sectional views showing steps of manufacturing the capacitor. In that part of the specification which will be described below and which includes the embodiments, for clarification of arrangements, a side of the capacitor on which a capacitance is formed is assumed to be the upper side of a substrate. Further, an upper electrode is formed over a lower electrode. However, it goes without saying that this vertical direction is not limited in connection with the manufacture of a capacitor or the use of a product.

As shown in FIGS. 1 and 2, a capacitor 1 comprises a film-like very flexible substrate 2, an upper-electrode-connected external leader electrode 4 and a lower electrode 5 formed on the flexible substrate 2 with a gap 3 between themselves so as not to be electrically connected together, a dielectric 6 formed to extend across the top surface of the external leader electrode 4 and the top surface of the lower electrode 5, an upper electrode 7 arranged opposite the lower electrode 5 across the dielectric 6, and a protective layer 8 formed to cover the upper electrode 7 and the underlying layers in order to protect these layers. Further, an adhesion layer 9 is formed between the external leader electrode 4 and lower electrode 5 and the dielectric 6 during a manufacturing process. Furthermore, a metal oxide layer 10 is formed between the dielectric 6 and the upper electrode 7.

The flexible substrate 2 is constituted by a flexible film having a thickness of about 50 μm. The external leader electrode 4 and the lower electrode 5 are arranged on the top surface of the flexible substrate 2 with a gap 3 of, for example, 0.1 mm width so as not to be electrically connected together. The gap 3 is filled with an insulator 11 such as polyimide.

Further, the external leader electrode 4 and the lower electrode 5 extend over side portions of the capacitor 1 to corresponding portions of the bottom surface of the substrate to form external leader electrode portions 4a and 5a, respectively. If the capacitor 1 is mounted in any product, the external leader electrode portions 4a and 5a of the external leader electrode 4 and the lower electrode 5, respectively, are connected to a printed circuit board of this product by soldering or conductive paste. A semi-cylindrical through-hole portion 12 is formed in a crosswise central portion of each side of the capacitor 1 so as to extend in a vertical direction. A wall surface portion facing the through-hole portion 12 electrically connects a side portion of top surface of the external leader electrode 4 to the external leader electrode portion 4a. A side portion of top surface of the lower electrode 5 is also electrically connected to the external leader electrode portion 5a.

A hole portion 6a for a contact hole is formed in the dielectric 6 so as to penetrate the dielectric in an inverted cone (which is tapered downward) form from a side that faces the upper electrode 7 to a side that faces the external leader electrode 4. A part of the upper electrode 7 which faces the hole portion 6a of the dielectric 6 is connected to the external leader electrode 4 while inclining and becoming hollow along the hole portion 6a. In this case, in particular, as shown in FIG. 3, the dielectric 6 is formed to have an inclination α of about 1° between an inclined wall surface of the hole portion 6a and the top surface 4b of the external leader electrode 4. Furthermore, the upper electrode 7 is formed to incline along the inclined wall surface of the hole portion 6a of the dielectric 6 and is connected to the external leader electrode 4. Thus, an inclined surface 7a of the upper electrode 7 which inclines along the inclined wall surface of the hole portion 6a of the dielectric 6 also has an inclination β of about 1° with respect to the top surface 4a of the external leader electrode 4.

Further, top surface portions of the dielectric 6 and the upper electrode 7 are formed substantially parallel with the top surface portions of the flexible substrate 2, the lower electrodes 5, and the external leader electrode 4. Accordingly, the layers are formed so that an upper end corner of the inclined wall surface of the hole portion 6a of the dielectric 6, is inclined downward at an angle α1 of about 1°, a lower end corner of the inclined wall surface of the hole portion 6a of the dielectric 6 is inclined upward at an angle α2 of about 1°, an upper end corner 7b of an inclined surface of the upper electrode 7 which inclines along the hole portion 6a of the dielectric 6 is inclined downward at an angle β1 of about 1°, and a lower end corner 7c of the inclined surface of the upper electrode 7 which inclines along the hole portion 6a of the dielectric 6 is inclined upward at an angle β2 of about 1°.

According to this arrangement, an area of the upper electrode 7 which is close to the connecting section with the external leader electrode 4 is formed along the hole portion 6a for a contact hole, penetrating the dielectric 6 in an inverted cone form at an inclination α of about 1°. Further, the inclined surface 7a and corners 7b and 7c of the upper electrode 7, formed along the hole portion 6a of the dielectric 6, are all gently inclined at angles β1 and β2 close to 1°. Accordingly, even if a thin product using the capacitor 1 is subjected to vibration or the like and thus relatively small external stress (external force) or stress is caused by a difference in expansion coefficient among the component materials in connection with temperature, stress concentration on the corners 7b and 7c is reduced to prevent the upper electrode 7 from cracking.

Further, since the gap 3 between the lower electrode 5 and the external leader electrode 4 is filled with the insulator 11, substantially no steps or corners are created in those areas of the dielectric 6 and upper electrode 7 which correspond to the gap 3. This avoids stress concentration on these areas to also prevent the upper electrode 7 from cracking.

Figure 5:
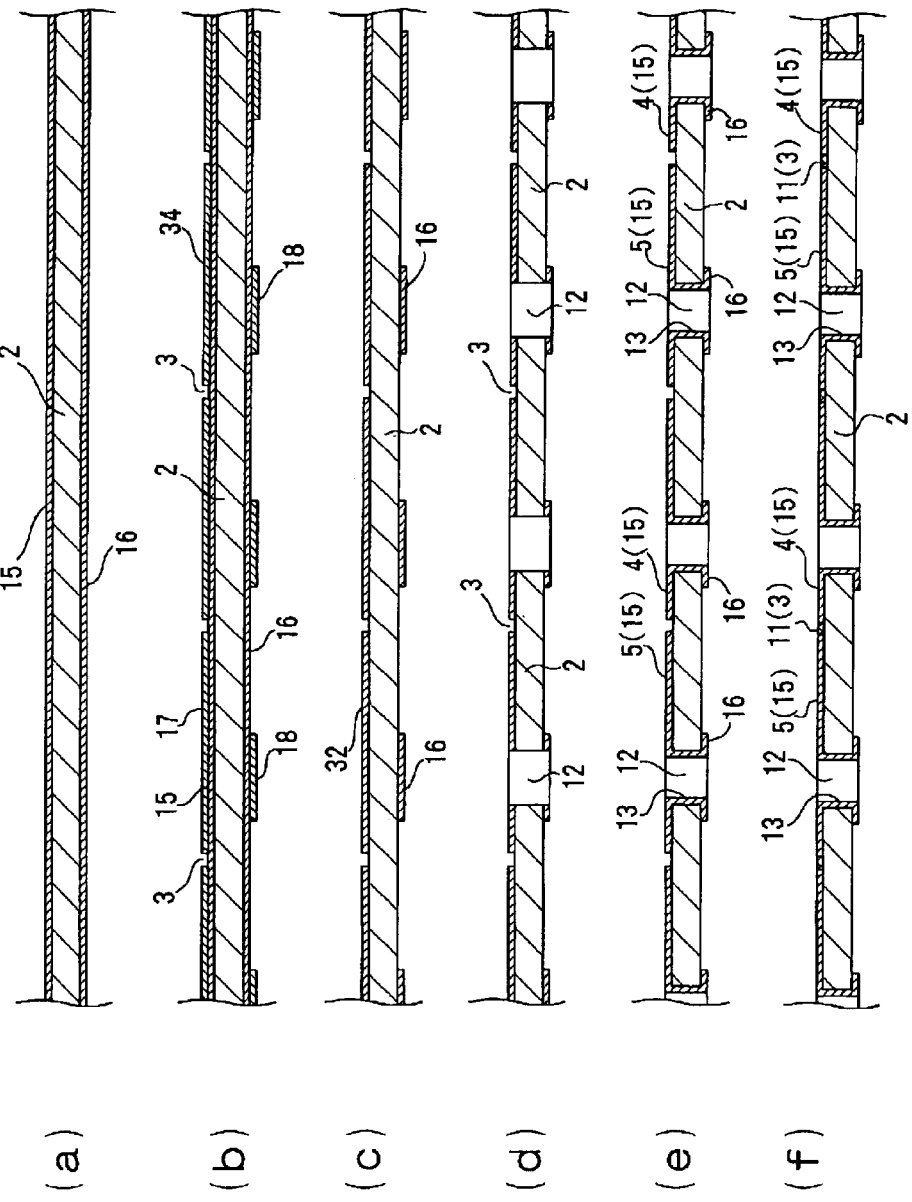
FIGS. 5(a) to 5(f) are sectional views showing steps of manufacturing the capacitor.
Figure 6:
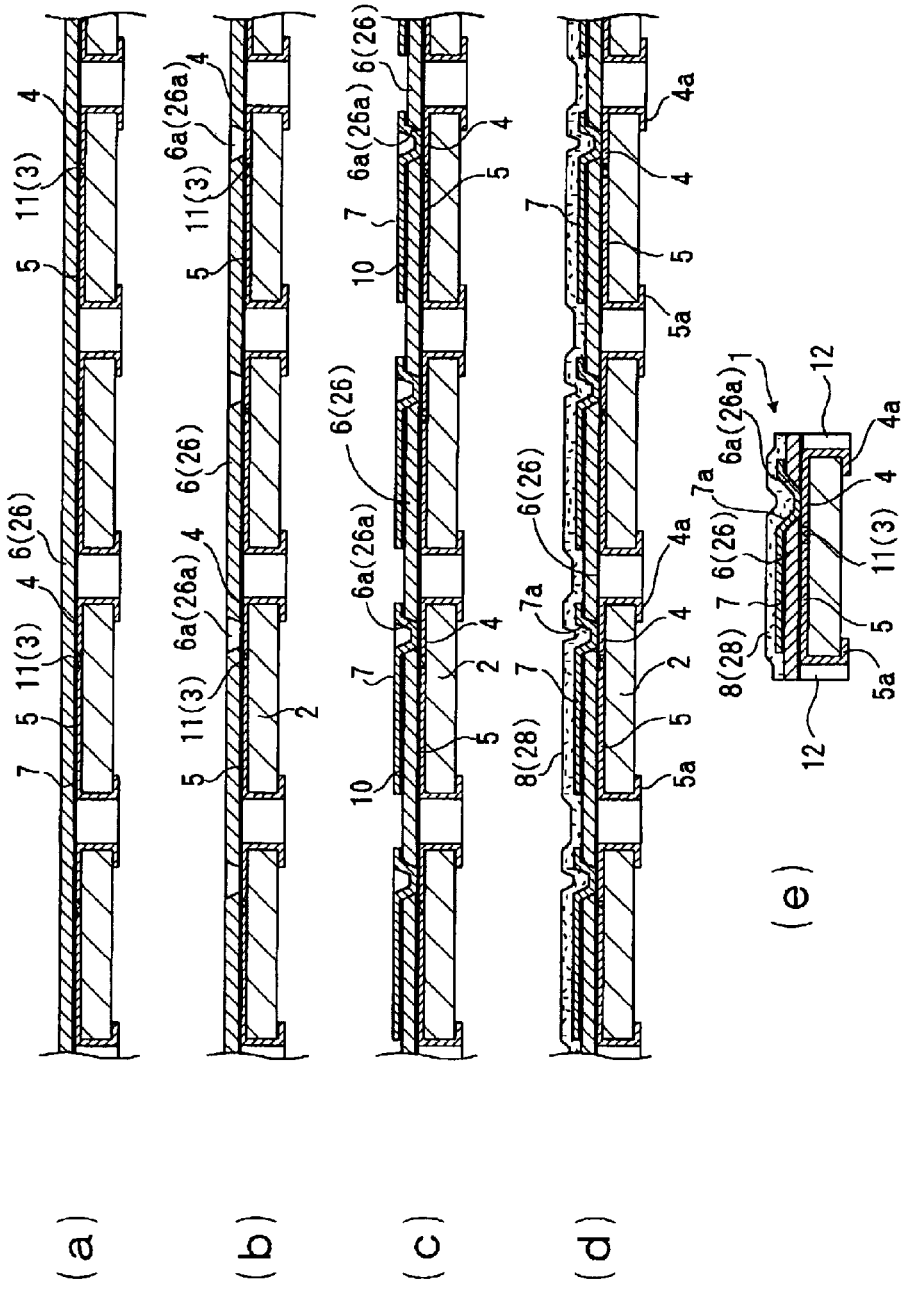
FIGS. 6(a) to 6(e) are sectional views showing steps of manufacturing the capacitor.

Then, a method of manufacturing the capacitor 1 will be described with reference to FIGS. 4 to 6. In the following description, the capacitor 1 to be manufactured has a length of 2.0 mm, a width of 1.2 mm, and a thickness of about 0.1 mm. In FIGS. 5 and 6, four or more capacitors 1 arranged in a horizontal direction are manufactured, and then the unitary capacitors 1 are obtained by splitting.

First Step (External Leader Electrode and Lower Electrode Forming Step)

First, as shown in FIG. 5(a), metallic deposits 15 and 16 composed of copper of thickness 10 μm are formed on the respective sides of the flexible substrate 2, composed of a polyimide sheet about 10 by 10 cm square and 50 μm in thickness.

Then, the photo resist layers 17 and 18 are formed, by a photo resist method, on the respective surfaces of the flexible substrate 2 having the metallic deposits 15 and 16 formed on the respective surfaces, as shown in FIG. 5(b). In this case, on the upper metallic deposit 15, a photo resist layer 17 is formed in areas other than those which correspond to the gaps (pitching grooves) 3 between the corresponding lower electrodes 5 and external leader electrodes 4 so that the gap 3 finally has a width of, for example, 0.1 mm, in order to avoid short-circuiting the lower electrode 5 and the external leader electrode 4. Further, on the lower metallic deposit 16, a photo resist layer 18 is formed in areas other than those which correspond to the external leader electrode portions 4a and 5a of the external leader electrodes 4 and the lower electrode 5, respectively, in order to form these electrode portions 4a and 5a. Then, a chemical etching process is executed using a ferric chloride solution or the like, and then the photo resist layers 17 and 18 are released. Then, the substrate is washed and then dried (see FIG. 5(c)).

Second Step (External Leader Electrode and Lower Electrode Forming Step (Through-Hole Portion Forming Step))

Then, as shown in FIG. 5(d), through-hole portions 12 are formed which penetrate the substrate in the vertical direction. The through-hole portions 12 are each formed at an expected cutting line with which the substrate is split into the unitary capacitors 1, described later, i.e. a position corresponding to an intermediate portion between the adjacent capacitors 1. To split the substrate into the unitary capacitors 1, holes as the through-hole portions 12 are opened in alignment so as to avoid damaging the flexible substrate 2 upon cutting (for example, the holes are formed to have a diameter of 0.6 mm). Subsequently, burrs on the metallic deposits 15 and 16 on peripheral walls of the through-hole portions 12 are removed. The substrate is then washed and dried. A well-known method such as drilling, punching or a laser is used to form the through-hole portions 12. A method such as chemical or electric etching, a laser, or polishing is used to remove burrs.

Third Step (External Leader Electrode and Lower Electrode Forming Step)

Then, as shown in FIG. 5(e), the wall surface of the through-hole portion 12 is plated with gold. Then, the substrate is washed and dried. This plated portion 13 connects the metallic deposits 15 and 16 together in the vertical direction to form the external leader electrode 4 and the lower electrode 5. In this case, a chemical or electric plating method is preferably used. This is because a vacuum deposition method or sputtering method is likely to open-circuit the through-hole portions 12 owing to mechanical stress resulting from expansion and contraction of the flexible substrate 2 induced by heat or humidity.

Fourth Step (Gap Filling Step)

Subsequently, as shown in FIG. 5(f), the gap 3 between the external leader electrode 4 and the lower electrode 5 is coated with a polyamic acid solution. After heating and removing an organic solvent, the substrate is heated to 260° C. or higher to subject the solution to condensation reaction to perfectly change it to polyimide. Thus, the gap is filled with the insulator 11. If the insulator 11 is not provided, a step is created which corresponds to the thickness of the metallic deposit 15, i.e. about 10 μm. However, by forming the insulator 11 as described previously, the height of the step on the metallic deposit 15 (the top surface portion of the external leader electrode 4 and lower electrode 5) can be reduced to between about 1 and 3 μm. In this case, organic matter on the surface oxidized by ozone gas may be removed as required.

A method with squeegees or ink jets is suitable for filling the insulator 11 into the gap 3. The use of the squeegee method is advantageous in that even viscous material can be used for the insulator 11. The use of the ink jet method is advantageous in that the insulator 11 can be formed precisely. However, the material must have a low viscosity.

Further, the material suitable for the insulator 11 is a thermosetting resin (such as novolac epoxy resin) or ultraviolet setting resin which can resist heat. When alcohol such as butanol, isopropylalcohol, or pentanol is added when filling the above resin into the gap, surface tension is advantageously reduced to create a smaller inclination between the insulator and the wall surface with which it contacts.

Fifth Step (Dielectric Forming Step)

Then, as shown in FIG. 6(a), about 10×10 cm squares with a thickness of 1.2 μm into which a polyphenylene sulfide film has been cut are laid, as the dielectrics 6, on the top surface on which the lower electrodes 5 are formed. A flexible flat organic resin sheet of about 1 in thickness is used to sandwich the dielectric 6 and the flexible substrate 2. The substrate is then hot-pressed for 60 minutes under conditions including an average pressure of 4.9 N/cm$^2$ and an average temperature of 240° C. As a result, an oligomer composed of a dechlorinated sodium compound of sodium 4-chlorophenyl sulfide in which a monomer polymerization unit is about 3 to 6 oozes out between the film-like dielectric 6 and the lower electrode 5, the external leader electrode 4, the insulator 11, or the exposed surface of the flexible substrate 2. The adhesion layer 9 is thus formed to cause these layers to adhere stably to one another.

The strength of the adhesion layer 9 varies depending on the temperature and period used for the adhesion step. If press temperature is 230° C. or lower, the required strength is not obtained however drastically the pressure or time is increased. On the contrary, if the press temperature is 270° C., the adhesion layer 7 exerts excessive adhesion force and fails to exhibit a withstand voltage of 16 V, however drastically the pressure or time is reduced. The results of analysis indicate that when the press temperature was raised, the number of pinholes increased mainly in the neighborhood of a filler added to improve the sliding capability of the film and that softening of the film, high contraction stress, and the like caused the pinholes to be formed to reduce the withstand voltage.

Sixth Step (Hole Portion Forming Step)

Then, as shown in FIG. 4, a metal mask 14 of thickness 0.1 mm is positioned 10 μm away from the dielectric 6. In the mask 14, two small holes 14a having a diameter of about 0.1 mm are formed at a position corresponding to the top surface portion of external leader electrode 4 of each capacitor 1. In this case, the mask 14 is attached to a table moved in response to operations of a screw rotated by a pulse motor, so as to move in the horizontal direction at a fixed speed.

In this state, high-frequency plasma is generated in an atmosphere with a degree of vacuum of about 10 Pa and a partial oxygen pressure of 20%. The plasma stream obtained is diffused and transmitted through the plasma stream via the small holes 14a in the mask 14. A specified time later, the pulse motor is driven to shift the mask 14 by 68 μm. Thus, the dielectric 6 is provided with the hole portion 6a for a contact hole the wall surface of which has an inclination α of 1° (the inclination with respect to the top surface (contact surface) 4b of the external leader electrode 4) (see FIGS. 4 and 6(b)). At this time, the time required for formation is decreased inversely proportional to the increasing power of plasma, so that the pulse motor must be driven at high speed. After the hole portion 6a for a contact hole has been formed in the dielectric 6, the leakage of oxygen is stopped, and the flexible substrate 2 is heated to vacuumize and dry reaction products. After drying, the substrate is cooled and taken out into the atmosphere.

At the hole portion forming step, the distance between the mask 14 and the dielectric 6 is not limited to 10 μm. For example, even if this distance is 100 μm and the pulse motor is driven so that the mask 14 is shifted by a distance (68 μm) half of the above distance, the wall surface of the hole portion 6a can be formed to have an inclination α of 1°. However, if the distance between the mask 14 and the dielectric 6 is reduced below 10 μm, the mask 14 may come into contact with part of the dielectric 6 to cause an open or short circuit because of a manufacture variation in the thickness of the flexible substrate 2 or the metallic deposit 15 or 16.

Seventh Step (Upper Electrode Forming Step)

Then, the mask is switched to a metal one (not shown) that covers areas corresponding to the hole portions 6a for contact holes. Then, a metal oxide layer 10 of silicon dioxide and of thickness about 5 nm is formed in the presence of argon with a degree of vacuum of about 1 Pa. The metal oxide layer 10 is then taken out into the atmosphere. Subsequently, the dielectric 6 is brought into tight contact with a metal mask (not shown) used to form the upper electrode 11 including the hole portion 6a for a contact hole. Thus, an upper electrode 7 of aluminum and of thickness about 100 nm is formed in the presence of argon with a degree of vacuum of about 1 Pa. The upper electrode 7 is then taken out into the atmosphere (see FIG. 6(c)). Thus, the upper electrode 7 is connected to the external leader electrode 4 at a position where the upper electrode is introduced into the hole portion 6a for a contact hole. Further, in this case, an area (along the hole portion 6a for a contact hole) of the upper electrode 7 which is close to the connecting section with the lower electrode 5 is formed along the hole portion 6a, penetrating the dielectric 6 in an inverted cone form at, an inclination α of 1°. That area of the inclined surface 7a (see FIG. 3) of the upper electrode 7 which is close to the connecting section is also inclined gently at an angle close to 1°.

Eighth Step (Protective Layer Forming Step)

Subsequently, the entire top surface of the flexible substrate 2 with the upper electrode 7 formed is coated with a paint obtained by mixing styrene and butadiene together at a weight ratio of 1 to 1 and adding 1% of organic peroxide to the mixture. The paint is then left hardened. Then, the entire top surface is further coated with an ultraviolet setting paint mainly composed of dicyclopentadiendimethanoldiacrylate and containing 3% of benzoinisopropylether dissolved in the solution so that the paint has an average thickness of 10 μm. The paint is then set by ultraviolet rays to form a protective layer 8 (see FIG. 6(d)). The protective layer 8 can be formed by a vacuum deposition method, a gravure coating method, an ink jet method, a squeegee method, or the like.

Ninth Step (Electrical Characteristics Inspecting Step)

Subsequently, electrical characteristics are inspected. The flexible substrate 2 is fixed to a test table. Then, test terminals are applied to the external leader electrode portion 4a of the external leader electrode 4 and the external leader electrode portion 5a of the lower electrode 5, both of which are located on the back surface of the substrate. Thus, the substrate is inspected for electrical characteristics including electrostatic capacity, loss angle, Q value, resonant frequency, and insulation resistance. At this time, if a trimming operation is not finally performed, the capacitor may have to be formed at an accuracy of ±2% of criterion values. In this case, a trimming operation is performed to precisely obtain an electrostatic capacity by scanning the opposite surface with focused light obtained by allowing a laser beam to pass through a lens, while measuring the electrostatic capacity. In general, the laser trimming is often carried out after the capacitor 1 product has been incorporated into a printed circuit board.

Tenth Step (Cutting and Appearance Inspecting Step)

After the electrical characteristics have been inspected, the flexible substrate 2, on which the upper electrodes 7, the dielectrics 6, the lower electrodes 5, and others have been formed, is cut into the capacitor 1 form units. The capacitors 1 obtained then have their appearances inspected. Then, the capacitors 1 are each packaged by taping to complete a product. In this regard, if excessive force is exerted to cut the flexible substrate 2, then undesirably the electrical characteristics may be impaired, the upper electrode 7, the lower electrode 5, or the external leader electrode 4 may be deformed, or burr may be created. Accordingly, it is necessary to avoid exerting excessive pressure to cut the flexible substrate 2. For cutting, a cutting edge must always be applied to the flexible substrate 2 from one direction, with a table provided to receive the opposite surface of the substrate. Furthermore, a larger angle of approach of the cutting edge makes it more likely to distort the upper electrode 7, the dielectric 6, the lower electrode 5, or the like. Accordingly, the cutting edge preferably approaches the substrate at a small angle of 45° or less.

As described above, a capacitor 1 (Example 1) was manufactured which had a length of 2.0 mm, a width of 1.2 mm, a thickness of about 0.1 mm, a rated voltage of 16 V, an electrostatic capacity of 20 pF, a loss angle of 0.0006, and an insulation resistance of 100 TΩ, wherein the inclination α was about 1° between the inclined side wall surface of the hole portion 6a for a contact hole of the dielectric 6 and the top surface of the external leader electrode 4, with the inclined surface 7a of the upper electrode 7 correspondingly having a substantially equal inclination.

Further, in this capacitor 1, the insulator 11 is filled into gap 3 between the external leader electrode 4 and the lower electrode 5. This reduces the height of the step between the metallic deposit 15 (the side portion of top surface of the external leader electrode 4 and lower electrode 5) and the insulator 11 to between about 1 and 3 μm. Consequently, substantially no steps are created in areas of the dielectric 6 and the upper electrode 7 which are stacked on the gap 3, to eliminate corners on which stress may concentrate. This prevents the upper electrode 7 from cracking.

Embodiment 2

In Embodiment 1, at the step of forming the hole portion 6a for a contact hole in the dielectric 6, the mask 14 is positioned 10 μm away from the dielectric 6, and then the pulse motor is driven to move the mask 14 in the horizontal direction so as to pass through a plasma stream. However, in this embodiment, the mask is transmitted through a plasma stream with the pulse motor stopped (the mask 14 remains positioned 10 μm away from the dielectric 6). With this manufacturing method, a capacitor (Example 2) was manufactured which also had a length of 2.0 mm, a width of 1.2 mm, a thickness of about 0.1 mm, a rated voltage of 16 V, an electrostatic capacity of 20 pF, a loss angle of 0.0006, and an insulation resistance of 1000 TΩ but which differed from the capacitor of Example 1, described in Embodiment 1, only in that the hole portion 6a of the dielectric 6 and the inclined surface 7a of the upper electrode 7, extending along the hole portion 6a, both had an inclination of about 7° on the external leader electrode 4.

Embodiment 3

In Embodiments 1 and 2, at the step of forming the hole portion 6a for a contact hole in the dielectric 6, the metal mask 14 is attached to the table that can be moved by the pulse motor. However, in Embodiment 3, instead, a polyphenylene sulfide film is provided between the metal mask 14 and the dielectric 6 as a spacer, and has a thickness of 2 μm and a hole formed at a position corresponding to the hole portion 6a for a contact hole and having a diameter of 0.3 mm. Then, the metal mask 14, contacted tightly with the dielectric 6 via the spacer, is transmitted through a plasma stream. With this method, a capacitor (Example 3) was manufactured which also had a length of 2.0 mm, a width of 1.2 mm, a thickness of about 0.1 mm, a rated voltage of 16 V, an electrostatic capacity of 20 pF, a loss angle of 0.0006, and an insulation resistance of 1000 TΩ but which differed from the capacitor of Embodiment 1, only in that the hole portion 6a of the dielectric 6 and the inclined surface 7a of the upper electrode 7, extending along the hole portion 6a, both had an inclination α of about 20° on the external leader electrode 4.

The material for the spacer may be polyethylene terephthalate or polyethylene naphthalate in place of polyphenylene sulfide.

COMPARATIVE EXAMPLE 1

At the step of forming the hole portion 6a for a contact hole in the dielectric 6 according to Embodiment 1, the hole portion 6a for a contact hole is formed using a photo resist film instead of the metal mask 14. Thus, a capacitor (Comparative Example 1) was manufactured which also had a length of 2.0 mm, a width of 1.2 mm, a thickness of about 0.1 mm, a rated voltage of 16 V, an electrostatic capacity of 20 pF, a loss angle of 0.0006, and an insulation resistance of 1000 TΩ but which differed from the capacitor of Embodiment 1, only in that the hole portion 6a of the dielectric 6 and the inclined surface 7a of the upper electrode 7, extending along the hole portion 6a, both had an inclination α of about 80° on the external leader electrode 4.

COMPARATIVE EXAMPLE 2

At the step of forming the hole portion 6a for a contact hole in the dielectric 6 according to Embodiment 1, the hole portion 6a for a contact hole is formed by tightly contacting the metal mask 14 with the dielectric 6. Thus, a capacitor (Comparative Example 2) was manufactured which also had a length of 2.0 mm, a width of 1.2 mm, a thickness of about 0.1 mm, a rated voltage of 16 V, an electrostatic capacity of 20 pF a loss angle of 0.0006, and an insulation resistance of 1000 TΩ but which differed from the capacitor of Embodiment 1, only in that the hole portion 6a of the dielectric 6 and the inclined surface 7a of the upper electrode 7, extending along the hole portion 6a, both had an inclination α of about 25° on the external leader electrode 4.

COMPARATIVE EXAMPLE 3

In Embodiment 1, the insulator 11 is filled into the gap 3 between the external leader electrode 4 and the lower electrode 5, and the dielectric 6 and others are formed over the insulator 11. However, in this comparative example, a capacitor is manufactured which is substantially equivalent to the one described in the prior art section.

Figure 23:
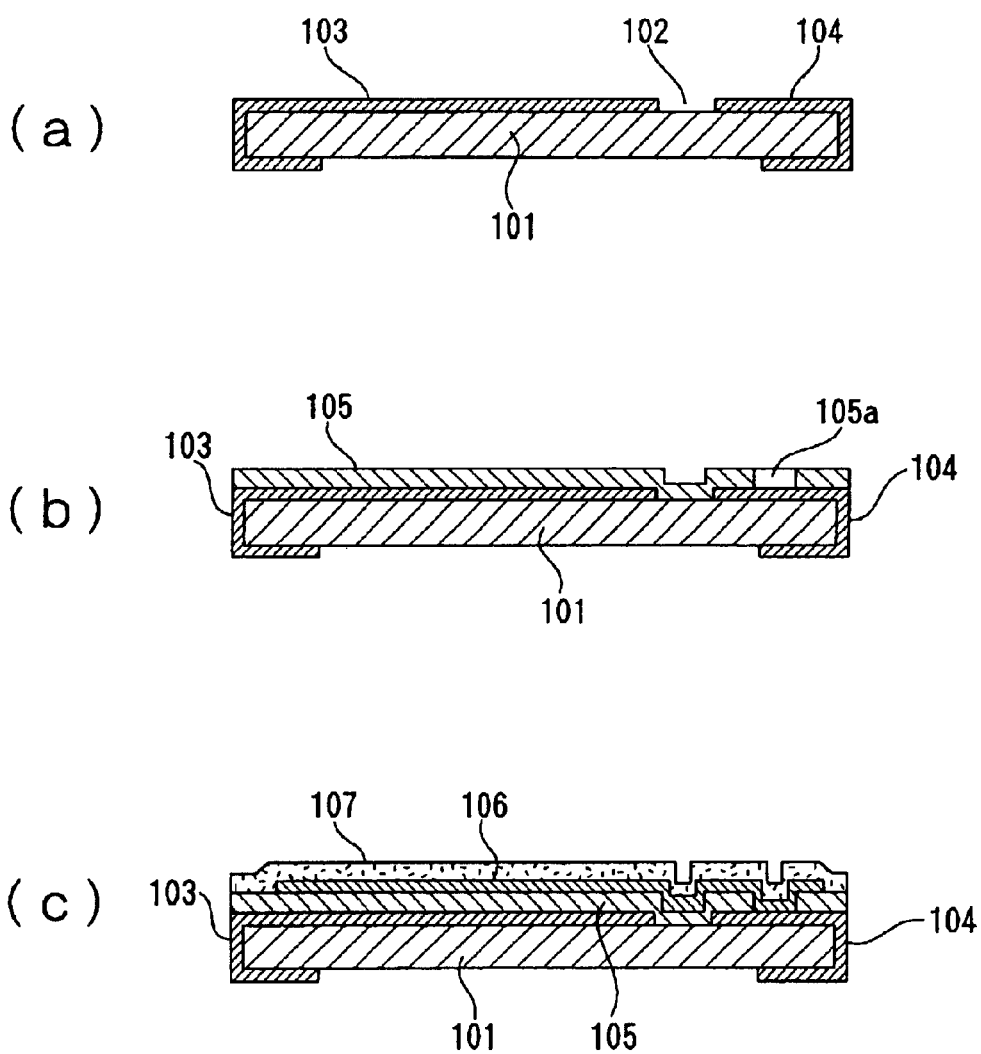
FIGS. 23(a) to 23(c) are sectional views showing steps of manufacturing a conventional capacitor.
Figure 26:
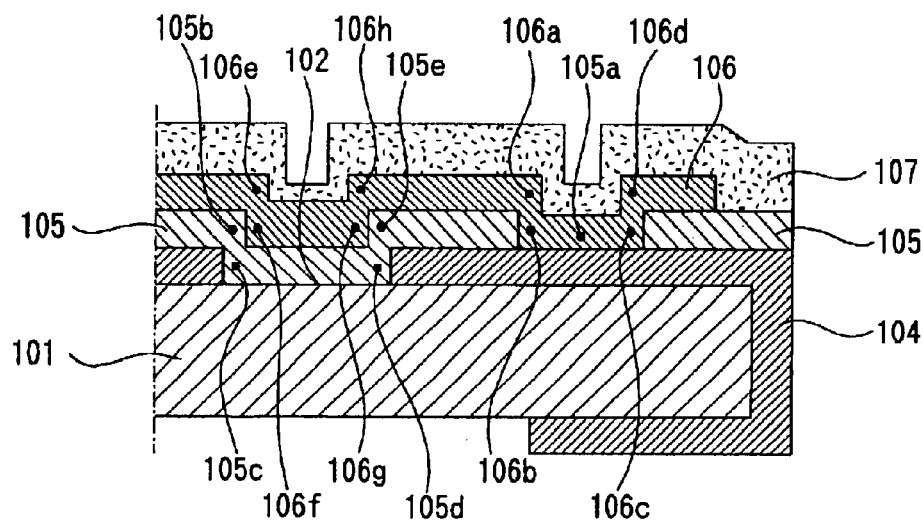
FIG. 26 is an enlarged sectional view of an essential part of a conventional capacitor, which is useful in describing how to solve problems with this capacitor.
Figure 27:
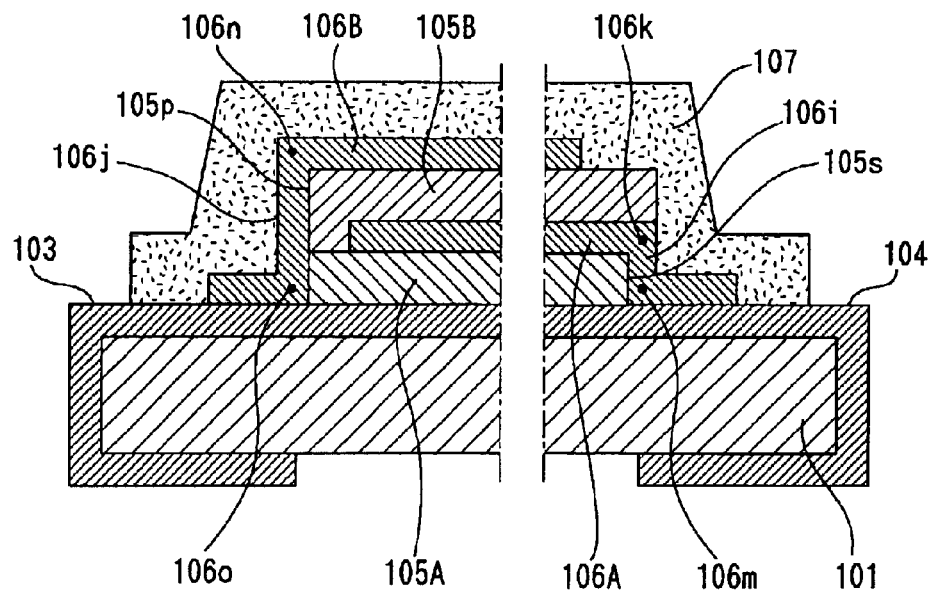
FIG. 27 is an enlarged sectional view of an essential part of another conventional capacitor, which is useful in describing how to solve problems with this capacitor.

That is, as shown in FIGS. 23 and 24, a capacitor (Comparative Example 3) is formed by forming a dielectric 105 and others on an external leader electrode 104 and a lower electrode 103 without filling any insulators into a gap 102 between the external leader electrode 104 and the lower electrode 103. If no insulators are provided in this manner, a step is created in the area of the gap 102 and corresponds to the thickness of a metallic deposit (the side portion of top surface of the external leader electrode 104 and lower electrode 103), i.e. about 10 µm as shown in FIG. 26. Consequently, steps are also created in the dielectric 105, the upper electrode 106, and others, which are stacked on the area of the gap 102.

Further, a wall portion of a hole portion 105a for a contact hole is inclined at an angle between about 80 and 90° with respect to the external leader electrode 104. A wall surface of the upper electrode 106, arranged on the external leader electrode 104, is also inclined at an angle between about 80 and 90° with respect to the top surface of the lower electrode. Thus, a capacitor (Comparative Example 3) was manufactured which also had a length of 2.0 mm, a width of 1.2 mm, a thickness of about 0.1 mm, a rated voltage of 16 V, an electrostatic capacity of 20 pF, a loss angle of 0.0006, and an insulation resistance of 1000 TΩ but in which the hole portion 105a of the dielectric 105 and the wall portion of the upper electrode 106, extending along the hole portion 105a, both had an inclination α between about 80 and 90° on the external leader electrode 4.

(Results of Comparisons)

One hundred capacitors of each of Examples 1 to 3 according to Embodiments 1 to 3, respectively, of the present invention were compared with one hundred capacitors of each of Comparative Examples 1 to 3 using heat cycle tests in which the capacitors are heated and cooled quickly between temperatures of −55° C. and 125° C. Table 1, shown below, shows the percentage of capacitors the electrostatic capacity of which decreased by more than 10%.

TABLE 1

Percentage of capacitors the output characteristics of which deviated by more than 10% in the heat cycle tests

| Sample | Inclination | 500 times | 1,000 times | 5,000 times | 10,000 times |
| --- | --- | --- | --- | --- | --- |
| Example 1 | 1 | 0% | 0% | 0% | 0% |
| Example 2 | 7 | 0% | 0% | 0% | 1% |
| Example 3 | 20 | 0% | 0% | 0% | 2% |
| Comparative Example 1 | 80 | 2% | 10% | 21% | 50% |
| Comparative Example 2 | 25 | 0% | 1% | 2% | 5% |
| Comparative Example 3 | 80–90 | 2% | 15% | 30% | 90% |

Further, in tests for another performance, the 100 capacitors of each of Examples 1 to 3 and the 100 capacitors of each of Comparative Examples 1 to 3 were charged and discharged at a test voltage of 16 V and a series resistance of 0.1 Ω. Table 2, shown below, shows the percentage of capacitors that exhibited, in this experiment, an electrostatic capacity corresponding to the destruction of one layer of the upper electrode 7, vs. the number of times that charge and discharge tests were repeated.

TABLE 2

Percentage of capacitors that exhibited an electrostatic capacity corresponding to the destruction of one layer of the upper electrode, vs. the number of times that charge and discharge tests were repeated

| Sample | Inclination | 5,000 times | 10,000 times | 50,000 times | 100,000 times |
| --- | --- | --- | --- | --- | --- |
| Example 1 | 1 | 0% | 0% | 0% | 0% |
| Example 2 | 7 | 0% | 0% | 1% | 3% |
| Example 3 | 20 | 0% | 1% | 2% | 7% |
| Comparative Example 1 | 80 | 10% | 25% | 50% | 90% |
| Comparative Example 2 | 25 | 2% | 5% | 8% | 15% |
| Comparative Example 3 | 80–90 | 15% | 40% | 80% | 100% |

The results of experiments shown in Tables 1 and 2 indicate that the inclination of the corners 7b and 7c of the upper electrode 7 (see FIG. 3) relates to the electric connectivity in the heat cycle tests and to the current resistance, the electric connectivity in the charge and discharge tests. When the capacitors with reduced electrostatic capacities were observed using an optical microscope, it was confirmed that the corner 7b or 7c of the upper electrode 7 had been cut in the middle. The mechanism of the phenomenon in which the electrode is cut is assumed to be as follows: An increase in the angle of the inclined surface 7a makes it prone to concentrate stress and facilitates the misalignment of adjacent column crystals constituting the upper electrode 7. Since the substrate 2 is flexible, it may be destroyed by stress caused by repeated contraction and expansion occurring at low and high temperatures, respectively, or by migration induced by an instantaneous large current.

Further, 10 capacitors of each of Examples 1 to 3 and Comparative Examples 1 to 3 had their electrostatic capacities reduced by 10% by means of laser trimming. These capacitors were then subjected to 60° C. humidity resistance load tests in which electricity was conducted through these capacitors for 1,000 consecutive hours at a temperature of 60° C. and a humidity of 95% using a test voltage of 16 VDC. As a result, for Examples 1 to 3, all 10 capacitors exhibited a variation of less than ±3% in electrostatic capacity and loss angle. However, for Comparative Example 1, 5 of the 10 capacitors exhibited a variation of ±3% or more in at least either electrostatic capacity or loss angle. For Example 2, 2 of the 10 capacitors exhibited a variation of ±3% or more in at least either electrostatic capacity or loss angle. When the upper electrode 7 was formed by vapor deposition, the hole portion 6a for a contact hole was corroded by humidity when the upper electrode 7 was vapor-deposited.

These results indicate that the capacitor 1 according to the present invention stably provides the upper electrode 7 with appropriate current resistance. This enables the characteristics of the flexible substrate 2 to be maintained and provides a capacitor 1 with excellent characteristics.

In the above embodiments, only the dielectric 6 composed of a polyphenylene sulfide film has been described. However, the present invention is not limited to this aspect. Good characteristics were also obtained by drying a resin pellet composed of a polyetheretherketone resin or syndiotactic polystyrene, at 150° C. for two hours, melting it at a temperature 20° C. higher than its melting point, extruding the molten pellet through a die to form a film, sequentially biaxially orienting the film, and immediately after the biaxial orientation, using this film, which was about 10 cm in width and 1.2 μm in thickness and was still warm, as the dielectric 6. Alternatively, the dielectric 6 may be composed of polyphenylene oxide, polycyclobutene, divylnaphthalene, aluminum oxide, or the like.

Further, in the description of the above embodiments, the flexible substrate 2 is composed of polyimide of thickness 50 μm. However, the present invention is not limited to this. Similar characteristics were obtained by using a sheet of thickness between 20 and 150 μm. Further, for the material, polyimide is generally composed of a 4,4'-diaminodiphenylether pyromellitic anhydride condensation polymer. However, similar characteristics were obtained using a sheet of a condensation polymer obtained by replacing pyromellitic anhydride with trimellitic anhydride, 2,3, 3',4'-biphenyltetracarboxylate dianhydride, 4,4'-[isopropyridenbis p-phenyleneoxy]diphthalate dianhydride, 1,2;4,5-benzenetetracarboxylate dianhydride, or 3,3',4,4'-diphenylsulfonetetracarboxylate dianhydride and by replacing the above acid anhydrides and 4,4'-diaminodiphenylether with 4,4'-diaminodiphenylmethane, m-phenylenediamine, 3,3'-diaminobenzophenon, or the like.

Further, the weight ratio of styrene to butadiene in the protective layer 8 was varied between 30:70 and 100:0, and the thickness of the protective layer 8 was varied between 1 and 30 μm. Then, all combinations of the weight ratio and the thickness produced similar good results. Furthermore, similar excellent characteristics were obtained by using, as the ultraviolet setting resin used for the protective layer 8, a compound containing a straight or side chain with 6 to 20 carbons and one or more methyl groups, or a monomer in which two acryloiluoxy groups are added to a compound containing 6 to 20 carbons and one or more alicyclic 6-member ring, or a monomer obtained by subjecting ethyleneglycol or propyleneglycol to addition reaction with one aromatic ring with two hydroxyl groups addition or a bisphenol-based compound and esterifying the reaction product with acrylic acid, or a combination of these compounds or monomers. Further, the diameter a (unit: mm) of the hole portion 6a for a contact hole affects the current resistance; the current resistance increases consistently with the diameter a of the hole portion 6a. However, the area of the electrodes corresponding to the capacity of the capacitor 1 decreases with increasing diameter a of the hole portion 6a for a contact hole or increasing radius of curvature b of the through-hole portion 12. Accordingly, the area of the electrodes corresponding to the capacity is preferably maximized. Consequently, the value for the optimal diameter a of the hole portion 6a for a contact hole is affected by both the width c (unit: mm) of the capacitor 1 and the radius of curvature b of the through-hole portion 12. The value for the radius of curvature b of the through-hole portion 12 is desirably 25 to 75% of the value for the width c of the capacitor 1. Further, if either the hole portion 6a for a contact hole or the through-hole portion 12 has its size increased, the size of the other must be reduced. Consequently, the value for the diameter a of the hole portion 6a for a contact hole is preferably 12 to 32% of the inverse of the value for the radius of curvature b of the through-hole portion 12.

Further, in the description of the capacitors of Examples 1 to 3 according to the above embodiments, the entire inclined wall surface of the hole portion 6a of the dielectric 6 has an inclination α between 0.1 and 20° with respect to the top surface 4b of the external leader electrode 4. In this case, the entire inclined surface 7a of the upper electrode 7, extending along the hole portion 6a, has a substantially equivalent inclination with respect to the top surface 4b of the external leader electrode 4. This substantially perfectly prevents cracking to provide a very reliable capacitor. However, the present invention is not limited to this aspect. The inclined wall surface of the hole portion 6a of the dielectric 6 may be partly provided with a portion extending from the lower end to upper end of the inclined wall surface and having an inclination α between 0.1 and 20° with respect to the top surface 4b of the external leader electrode 4. Also in this case, the portion inclined gently so as to extend from lower end to upper end is prevented from cracking. Therefore, a conductive state can be maintained appropriately.

Further, in the capacitors of Examples 1 to 3 according to the above embodiments, the insulator 11, filled into the gap 3 between the external leader electrodes 4 and the lower electrode 5, makes the top surface of the insulator 11 flush with the top surface 4b of the external leader electrode 4 and the top surface of the lower electrode 5. The present invention is not limited to this aspect. If the insulator 11 has an inclination of ±20° or less with respect to the top surface 4b of the external leader electrode 4 and the top surface of the lower electrode 5, cracking is prevented to enable the conductive state to be maintained appropriately as in the case with the inclined surface 7a of the upper electrode 7.

Embodiment 4

Now, description will be given of a capacitor according to a fourth embodiment of the present invention.

Figure 7:
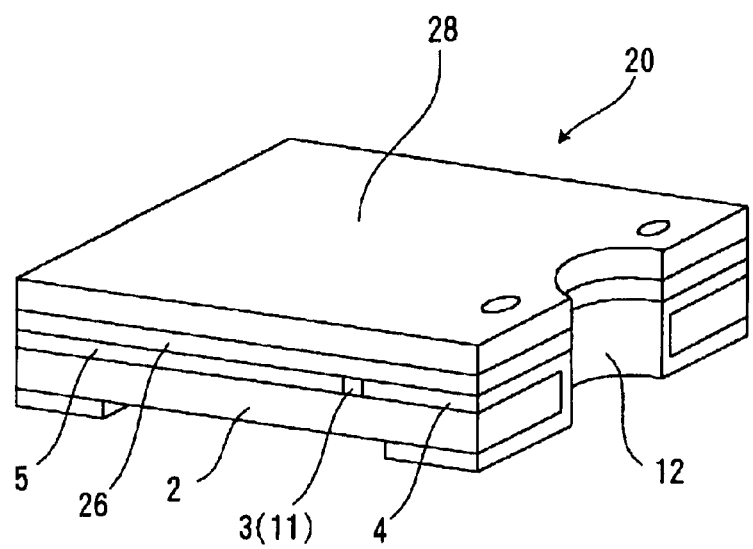
FIG. 7 is a perspective view showing a capacitor according to a fourth embodiment of the present invention.
Figure 8:
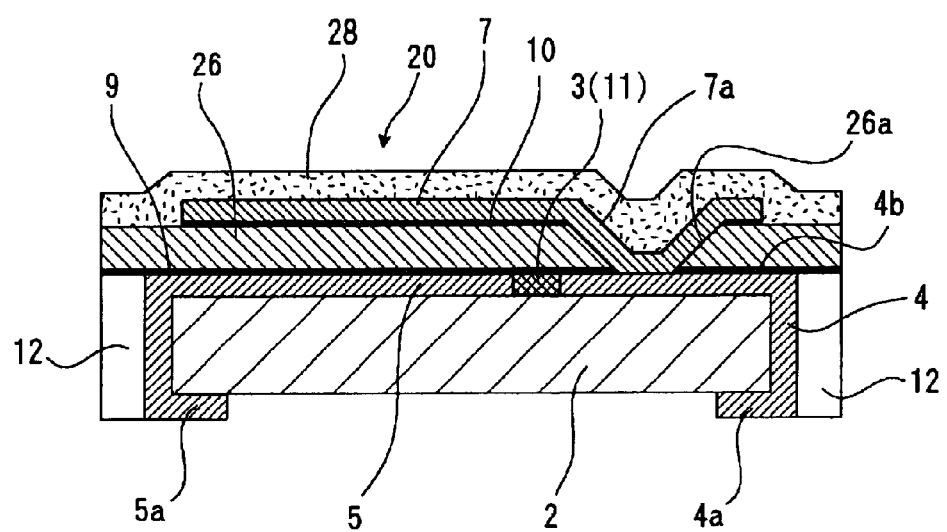
FIG. 8 is a sectional view of the capacitor in FIG. 7.

FIG. 7 is a perspective view showing a capacitor 20. FIG. 8 is a sectional view of the capacitor 20. This capacitor 20 essentially has a structure similar to that of the capacitor 1 according to Embodiments 1 to 3 except that a hole portion of a dielectric 26 is shaped like an ellipse in order to make a connection between the upper electrode 7 and the external leader electrode 4 elliptical.

However, the material for the dielectric 26 and its forming method and the material for a protective layer 28 and its forming method are different from those in Embodiments 1 to 3. That is, in Embodiment 4, the capacitor is manufactured by changing the fifth and eighth steps according to Embodiment 1 as described below.

Fifth Step (Dielectric Forming Step)

Wax chips or the like are pushed into the through-hole portion 12 from the back surface of the flexible substrate 2 to close the through-hole portion 12. Monomer vapors of divinylbenzene are deposited on the surface of the flexible substrate 2 provided with the lower electrode 5 by irradiating the surface with a 10-keV electron line. Thus, the dielectric 26 is formed to a thickness of 0.3 μm (see FIG. 6(a)).

Eighth Step (Protective Layer Forming Step)

The entire surface of the flexible structure 2 is coated, starting with the front surface, with a paint obtained by mixing styrene and butadiene at a weight ratio of 1:1 and adding 1% of organic peroxide to the mixture so that the paint has an average thickness of 10 μm. The flexible substrate 2 is irradiated with an electron line to preclude the paint from flowing. Then, the entire top surface is coated with an ultraviolet setting paint obtained by dissolving 3% of an ultraviolet sensitizer into dicyclopentadienedimethanol-diacrylate, a main component, so that the paint has an average thickness of 1 μm. Then, the substrate is irradiated with an ultraviolet ray to form a protective layer 28. Subsequently, a heating process at 160° C. or higher is executed in vacuum to completely harden the dielectric 26 and the protective layer 28, while simultaneously drying the wax chips in vacuum.

Thus, a plated electrode surface free from organic matter is exposed. In this case, the protective layer 28 can be formed by a vacuum deposition method, a gravure coating method, an ink jet method, a squeegee method, or the like.

By changing the fifth and eighth steps according to Embodiment 1 as described above, a capacitor was manufactured in which the inclined wall surface of the hole portion 26a of the dielectric 26 and the inclined surface 7a of the upper electrode 7, extending along the hole portion 26a, had an inclination α of 1° with respect to the top surface 4b of the external leader electrode 4 and which had a length of 2.0 mm, a width of 1.2 mm, a thickness of about 0.1 mm, a rated voltage of 16V, an electrostatic capacity of 40 pF, a loss angle of 0.001, and an insulation resistance of 100 TΩ. When subjected to heat cycle tests and charge and discharge tests, this capacitor produced good results as in the case with the above embodiments.

Similar good results were produced when the monomer vapors were composed of divinylbiphenyl or divinylnaphthalate instead of divinylbenzene.

Furthermore, the hole portion 26a for a contact hole could be similarly formed by vapor-depositing silicon dioxide to a thickness of about 0.6 μm as the dielectric 26 and using organic fluorine compound vapors instead of oxygen gas at the sixth step. The capacitor obtained produced good results. Likewise, the hole portion 26a for a contact hole could be appropriately formed by vapor-depositing strontium titanate to a thickness of about 0.6 μm as the dielectric 26 by reactive sputtering and using organic chloride compound vapors in place of oxygen gas at the sixth step. The capacitor obtained produced good results.

In the description of the capacitor of this embodiment, the entire inclined wall surface of the hole portion 26a of the dielectric 26 has an inclination α of 1° with respect to the top surface 4b of the external leader electrode 4. This substantially perfectly prevents cracking to provide a very reliable capacitor. However, the present invention is not limited to this aspect. The inclined wall surface of the hole portion 26a of the dielectric 26 may be partly provided with a portion extending from the lower end to upper end of the hole portion 26a and having an inclination α between 0.1 and 20° with respect to the top surface 4b of the external leader electrode 4. Also in this case, the portion inclined gently so as to extend from lower end to upper end is prevented from cracking. Therefore, the conductive state can be maintained appropriately.

Embodiment 5

Figure 9:
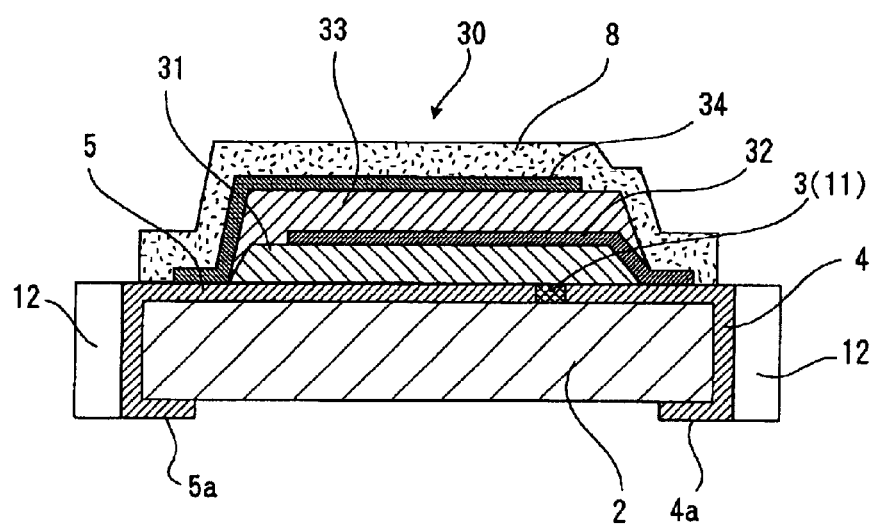
FIG. 9 is a sectional view showing a capacitor according to a fifth embodiment of the present invention.
Figure 10:
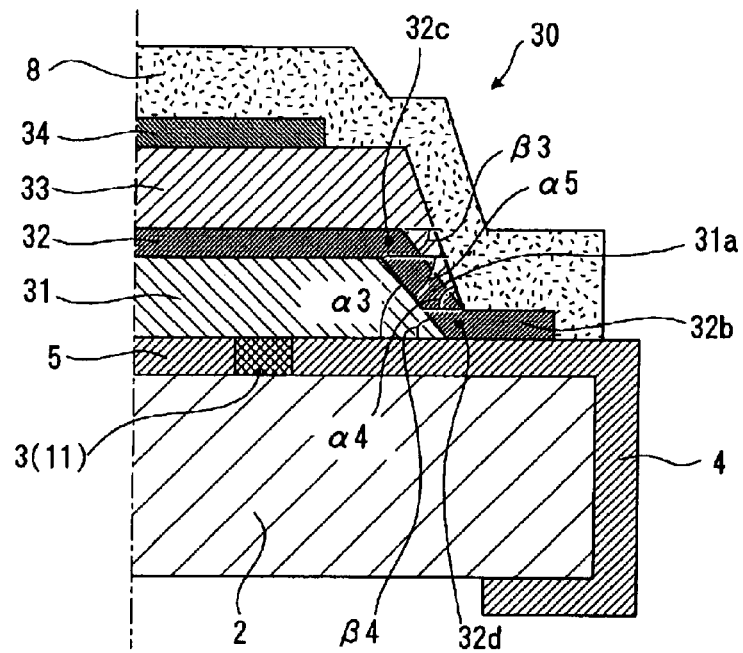
FIG. 10 is an enlarged sectional view of essential parts including an inclined downward extending portion of a first upper electrode of the capacitor in FIG. 9 and neighborhoods of this portion.
Figure 11:
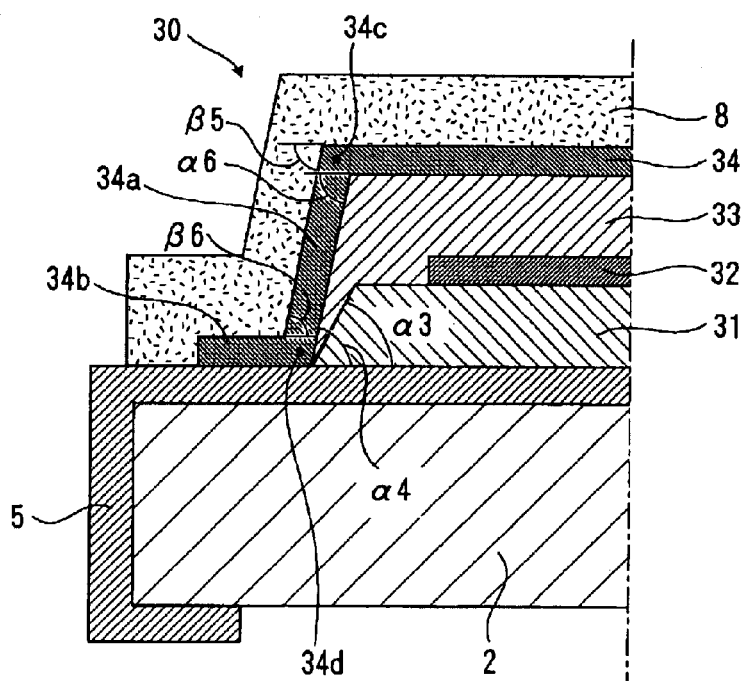
FIG. 11 is an enlarged sectional view of essential parts including an inclined downward extending portion of a second upper electrode of the capacitor and neighborhoods of this portion.

Now, description will be given of a capacitor according to a fifth embodiment of the present invention. FIG. 9 is a sectional view showing a capacitor. FIG. 10 is an enlarged view of essential parts including an inclined downward extending portion of a first upper electrode of the capacitor in FIG. 9 and neighborhoods of this portion. FIG. 11 is an enlarged view of essential parts including an inclined downward extending portion of a second upper electrode of the capacitor and neighborhoods of this portion. FIGS. 12(a) to 12(f) and 13(a) to 13(f) are sectional views showing steps of manufacturing the capacitor.

As shown in FIG. 9, a plurality of (in FIG. 9, two) dielectrics 31 and 33 and a plurality of (in FIG. 9, two) upper electrodes 32 and 34 are formed in a capacitor 30. That is, a first upper electrode 32 is formed via a first dielectric 31 on the flexible substrate 2 on which the upper-electrode-connected external leader electrode 4 and the lower electrode 5 are formed via the gap 3. Furthermore, a second upper electrode 34 is formed on the first upper electrode 32 via a second dielectric 33. Moreover, the first upper electrode 32 is connected to the external leader electrode 4 via an inclined downward extending portion 32a extending obliquely downward and a connecting section 32b extending from the inclined downward extending portion 32a. The second upper electrode 34 is connected to the lower electrode 5 via an inclined downward extending portion 34a extending obliquely downward and a connecting section 34b extending from the inclined downward extending portion 34a.

End wall surfaces 31a and 33a of the first and second dielectrics 31 and 33, respectively, which face the inclined downward extending portions 32a and 34a of the first and second upper electrodes 32 and 34, respectively, are formed to incline at the angle described later from a side that faces the bottom surface of the first or second upper electrode 32 or 34 to a side that faces the top surface of the external leader electrode 4 or the lower electrode 5. In this case, the inclined end wall surface 31a of the first dielectric 31 has an inclination α3 of 0.25° with respect to the top surface of external leader electrode 4. Further, the inclined end wall surface 33a of the second dielectric 33 has an inclination α4 of about 2° with respect to the top surface of the lower electrode 5.

Further, the first and second upper electrodes 32 and 34 are inclined and depressed along the first and second dielectrics 31 and 33, respectively, and then connected to the external leader electrode 4 and the lower electrode 5. The top surface portions of the first and second dielectrics 31 and 33 and first and second upper electrodes 32 and 34 are formed substantially parallel with the top surface portions of the flexible substrate 2, lower electrode 5, and external leader electrode 4. Accordingly, as shown in FIG. 10, the upper end corner of inclined end wall surface 31a of the first dielectric 31 is inclined downward at an angle α5 of 0.25°, the upper end corner 32c of inclined downward extending portion 32a of the first upper electrode 32 is inclined downward at an angle β3 of 0.25°, the lower end corner of inclined end wall surface 31a of the first dielectric 31 is inclined upward at an angle α3 of 0.25°, and the lower end corner 32d of inclined downward extending portion 32a of the first upper electrode 32 is inclined upward at an angle β4 of 0.25°. Further, as shown in FIG. 11, the upper end corner of inclined end wall surface of the second dielectric 33 is inclined downward at an angle α6 of about 2°, the upper end corner 34c of inclined downward extending portion 34a of the second upper electrode 34 is inclined downward at an angle β5 of about 2°, the lower end corner of inclined end wall surface 33a of the second dielectric 33 is inclined upward at an angle α4 of about 2°, and the lower end corner 34d of inclined downward extending portion 34a of the second upper electrode 34 is inclined upward at an angle β6 of about 2°.

With this arrangement, not only the corners 32c and 32d of upper and lower ends of the downward extending portion 32a of the first upper electrode 32 are very gently inclined at an angle of 0.25° but the corners 34c and 34d of upper and lower ends of the downward extending portion 34a of the second upper electrode 34 are very gently inclined at an angle of about 2°. Accordingly, even if a thin product using the capacitor 30 is subjected to vibration or the like and thus relatively small external stress (external force) or stress is caused by a difference in expansion coefficient among the component materials in connection with temperature, stress concentration on the corners 32c, 32d, 34c, and 34d of the first and second upper electrodes 32 and 34, respectively, is reduced to prevent the first and second upper electrodes 32 and 34 from cracking.

Further, also in this embodiment, the gap 3 between the lower electrode 5 and the external leader electrode 4 is filled with the insulator 11. Thus, substantially no corners are created in those areas of the first and second dielectrics 31 and 33 and first and second upper electrodes 32 and 34 which correspond to the gap 3. This avoids stress concentration on these areas to also prevent the first and second upper electrodes 32 and 34 from cracking.

Figure 12:
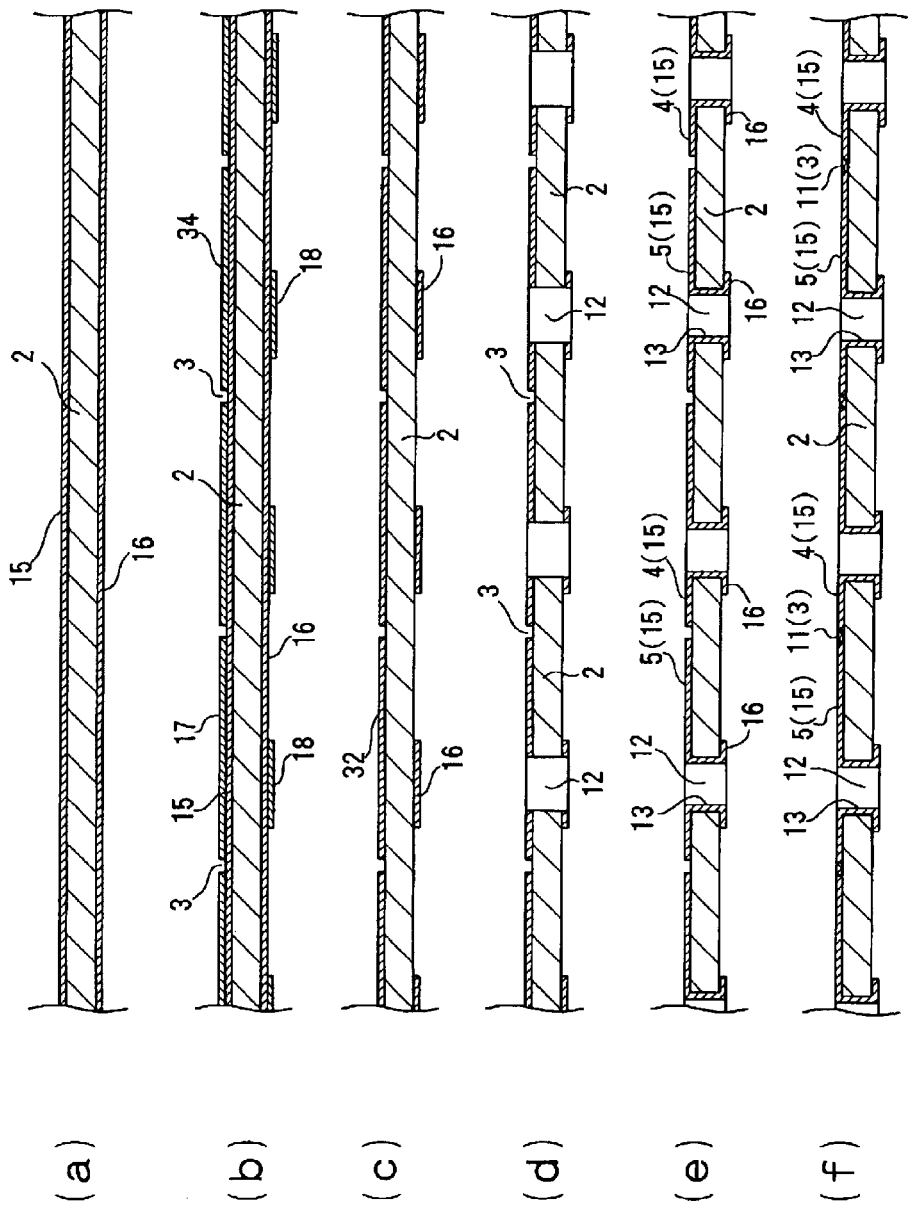
FIGS. 12(a) to 12(f) are sectional views showing steps of manufacturing the capacitor.

Then, a method of manufacturing the capacitor 30 will be described. In the following description, the capacitor 30 to be manufactured has a length of 2.0 mm, a width of 1.2 mm, and a thickness of about 0.1 mm. In FIG. 12, four or more capacitors 1 are manufactured, and then the unitary capacitors 30 are obtained by splitting.

First Step (External Leader Electrode and Lower Electrode Forming Step)

First, as shown in FIG. 12(a), the metallic deposits 15 and 16 composed of copper of thickness 10 $\mu$m are formed on the respective sides of the flexible substrates 2, composed of a polyimide sheets about 10 by 10 cm square and 50 $\mu$m in thickness.

Then, the photo resist layers 17 and 18 are formed, by a photo resist method, on the respective surfaces of the flexible substrate 2 having the metallic deposits 15 and 16 formed on the respective surfaces, as shown in FIG. 12(b). In this case, on the upper metallic deposit 15, the photo resist layer 17 is formed in areas other than those which correspond to the gaps (pitching grooves) 3 between the corresponding lower electrodes 5 and external leader electrodes 4 so that the gap 3 finally has a width of, for example, 0.1 mm, in order to avoid short-circuiting the lower electrode 5 and the external leader electrode 4. Further, on the lower metallic deposit 16, the photo resist layer 18 is formed in areas other than those which correspond to the external leader electrode portions 4a and 5a of the external leader electrodes 4 and the lower electrode 5, respectively, in order to form these electrode portions 4a and 5a. Then, a chemical etching process is executed using a ferric chloride solution or the like, and then the photo resist layers 17 and 18 are released. Then, the substrate is washed and then dried (see FIG. 12(c)).

Second Step (External Leader Electrode and Lower Electrode Forming Step (Through-Hole Portion Forming Step))

Then, as shown in FIG. 12(d), the through-hole portions 12 are formed. The through-hole portions 12 are each formed at an expected cutting line with which the substrate is split into the unitary capacitors 1, described later, i.e. a position corresponding to an intermediate portion between the adjacent capacitors 30. To split the substrate into the unitary capacitors 30, holes as the through-hole portions 12 are made in alignment so as to avoid damaging the flexible substrate 2 upon cutting (for example, the holes are formed to have a diameter of 0.6 mm). Subsequently, burrs on the metallic deposits 15 and 16 on peripheral walls of the through-hole portions 12 are removed. The substrate is then washed and dried. A well-known method such as drilling, punching or a laser is used to form the through-hole portions 12. A method such as chemical or electric etching, a laser, or polishing is used to remove burrs.

Third Step (External Leader Electrode and Lower Electrode Forming Step)

Then, as shown in FIG. 12(e), a plating method is used to plate the remaining copper deposits 15 and 16 and the inner surface of the through-hole portion 12 with copper to a thickness of 10 $\mu$m. These components are further plated with nickel to a thickness of 4 $\mu$m and then with gold to a thickness of 0.08 $\mu$m. The substrate is then washed and dried. This metallic deposit 13 connects the metallic deposits 15 and 16 in the vertical direction to form the external leader electrode 4 and the lower electrode 5.

Fourth Step (Gap Filling Step)

Subsequently, as shown in FIG. 12(f), the gap 3 between the external leader electrode 4 and the lower electrode 5 is coated with a polyamic acid solution using a screen printing method. The substrate is heated to subject the solution to condensation reaction to perfectly change it to polyimide. Thus, the gap 3 is filled with the insulator 11. If the insulator 11 is not provided, a step is created which corresponds to the thickness of the metallic deposit 15, i.e. about 10 $\mu$m. However, by forming the insulator 11 as described previously, the height of the step on the metallic deposit 15 (the top surface portion of the external leader electrode 4 and lower electrode 5) can be reduced to between about 1 and 3 $\mu$m.

Fifth Step (First Dielectric and Inclined Surface Forming Step)

Figure 13:
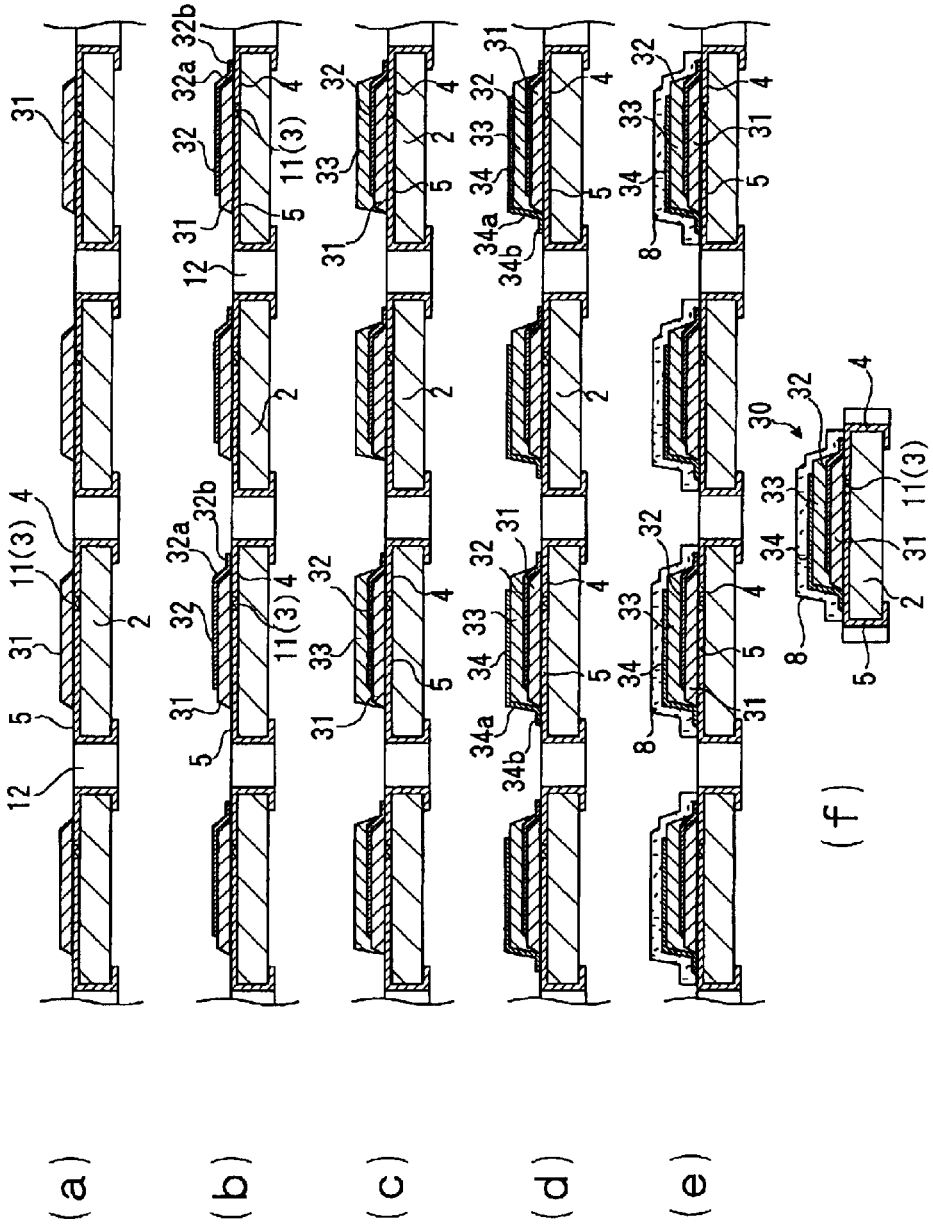
FIGS. 13(a) to 13(f) are sectional views showing steps of manufacturing the capacitor.

Then, as shown in FIG. 13(a), the first dielectric 31 is formed by using a sputtering method to deposit strontium titanate through an aperture mask of a predetermined pattern to a thickness of 300 nm. At this time, the first dielectric 31 is formed to extend across the lower electrode 5 and the insulator 11 to a part of the external leader electrode 4. An end of the first dielectric 31 present on the external leader electrode 4 is formed so as to have an inclination of about 0.25° during sputtering. To create this inclination, the mask 14 (see FIG. 4) is separated from the flexible substrate 2, or the thickness of the mask 14 is set at 0.1 mm or more so that the diameter of the aperture in a thickness direction is larger on a substrate side than on a sputter particle entering side. Alternatively, as shown in FIG. 4, a mask 14 of thickness about 0.1 mm is separated about 10 $\mu$m away from the dielectric 6 and is moved or vibrated over a dimension of about 68 $\mu$m by a motor such as a pulse motor, a solenoid coil, or the like. Alternatively, the mask is moved over a small specified dimension or smaller utilizing a change in the size of material of a large thermal expansion coefficient which change is effected by heating the material. These methods provide a similar inclination.

Sixth Step (First Upper Electrode Forming Step)

Then, as shown in FIG. 13(b), the first upper electrode 32 is formed on the first dielectric 31 and the external leader electrode 4 by similarly using a sputtering method to deposit aluminum through an aperture mask of a predetermined pattern to a thickness of 100 nm. At this time, the first upper electrode 32 is also formed, as an inclined downward extending portion 32a, on a surface of the first dielectric 31 which is inclined at an angle of about 0.25°. The inclined downward extending portion 32a is connected to the external leader electrode 4 via the connecting section 32b, extending from the inclined downward extending portion 32a.

Seventh Step (Second Dielectric and Inclined Surface Forming Step)

Then, as shown in FIG. 13(c), the same operation as that of the fifth step is repeated to form the second dielectric 33 on the first upper electrode 32 to a thickness of about 300 nm. At this time, a part of the second dielectric 33 which reaches the lower electrode 5 or the external leader electrode 4 has an inclination of about 2°.

Eighth Step (Second Upper Electrode Forming Step)

As shown in FIG. 13(d), the same operation as that of the sixth step is repeated to form the second upper electrode 34 on the second dielectric 33 to a thickness of 100 nm. The second upper electrode 34 is connected to the lower electrode 5 via the connecting section 34a compared to the first upper electrode 32.

Ninth (Dielectric and Upper Electrode Multilayer Forming Step)

Subsequently, the fifth to eighth steps are repeated until the capacitor 30 has a predetermined electrostatic capacity. In this case, the angle of the dielectric on the external leader electrode 4 or the lower electrode 5 gradually increases. However, it has been found that when the maximum inclination exceeds about 20°, 1% of the capacitor elements are open-circuited after 10,000 cycles of charge and discharge tests and that when the maximum inclination exceeds 25°, 5% of the capacitor elements are open-circuited. Accordingly, the maximum inclination must be set at about 20° or less. Thus, it has been found that if 100 layers are stacked together, when the dielectric is about 300 nm in thickness, its inclinations on the external leader electrode 4 and the lower electrode 5 must be set at 0.2° or less.

Tenth Step (Protective Layer Forming Step)

Then, as shown in FIG. 13(e), the protective layer 8 is formed by using a sputtering method to deposit silicon dioxide on the final upper electrode, including the first upper electrode 32 and the second upper electrode 34, to a thickness of 1 μm.

Eleventh Step (Cutting and Appearance Inspecting Step)

Then, as shown in FIG. 13(f), the flexible substrate 2 on which the protective layers 8 and others have been formed are cut at expected cutting positions (capacitor 1 form units). With this method, a capacitor 30 was manufactured which had a length of 2.0 mm, a width of 1.2 mm, a thickness of about 0.1 mm, a rated voltage of 10 V, an electrostatic capacity of 0.01 μF, a loss angle of 0.008, and an insulation resistance of 10 TΩ.

Embodiment 6

In Embodiment 5, described above, the plurality of dielectrics and upper electrodes are formed. However, in Embodiment 6, the capacitor is manufactured under the same step conditions as those of Embodiment 5 except that the fifth to eighth steps of Embodiment 5 are carried out for only one layer of the dielectric 31 and for only one layer of the upper electrode 32. With this method, a capacitor was manufactured in which the inclined wall surface and inclined downward extending portion 31a of the dielectric 31 and upper electrode 32 had an inclination of about 0.25° with respect to the top surface of the external leader electrode 4 and which had a length of 2.0 mm, a width of 1.2 mm, a thickness of about 0.1 mm, a rated voltage of 16 V, an electrostatic capacity of 20 pF, a loss angle of 0.008, and an insulation resistance of 100 TΩ.

Embodiment 7

In the description of Embodiment 5, described above, the mask 14 is moved or vibrated over a dimension of about 68 μm. However, in Embodiment 7, the capacitor is manufactured under the same step conditions as those of Embodiment 5 except that the mask 14 is moved or vibrated over a dimension of about 40 μm. With this method, a capacitor was manufactured in which the inclined wall surface and inclined downward extending portion 32a of the dielectric 31 and upper electrode 32 had an inclination of about 0.43° with respect to the top surface of the external leader electrode 4 and which had a length of 2.0 mm, a width of 1.2 mm, a thickness of about 0.1 mm, a rated voltage of 16 V, an electrostatic capacity of 20 pF, a loss angle of 0.008, and an insulation resistance of 100 TΩ.

Embodiment 8

In Embodiments 5 and 7, described above, the pulse motor is driven to move or vibrate the mask 14. However, according to Embodiment 8, at the fifth step of Embodiment 5, the pulse motor is stopped and the mask 14 is applied before sputtering. With this method, a capacitor was manufactured in which the inclined wall surface and inclined downward extending portion 32a of the dielectric 31 and upper electrode 32 had an inclination of about 7° with respect to the top surface of the external leader electrode 4 and which had a length of 2.0 mm, a width of 1.2 mm, a thickness of about 0.1 mm, a rated voltage of 16 V, an electrostatic capacity of 20 pF, a loss angle of 0.008, and an insulation resistance of 100 TΩ.

Embodiment 9

In Embodiments 5 to 8, described above, at the step of forming the dielectric 31, the metal mask 14 is attached to the table that can be moved by the pulse motor. However, according to Embodiment 9, instead, a polyphenylene sulfide film of 2 μm in thickness is provided between the metal mask 14 and the dielectric 31 as a spacer. Then, a sputtering operation is performed with the metal mask 14 tightly contacted with the dielectric via this spacer. With this method, a capacitor was manufactured in which the inclined wall surface and inclined downward extending portion 32a of the dielectric 31 and upper electrode 32 had an inclination of about 20° with respect to the top surface of the external leader electrode 4 and which had a length of 2.0 mm, a width of 1.2 mm, a thickness of about 0.1 mm, a rated voltage of 1.6 V, an electrostatic capacity of 20 pF, a loss angle of 0.0006, and an insulation resistance of 1,000 TΩ.

COMPARATIVE EXAMPLE 4

A capacitor was manufactured which was similar to that of Embodiment 5, described above, i.e. had a length of 2.0 mm, a width of 1.2 mm, a thickness of about 0.1 mm, a rated voltage of 16 V, an electrostatic capacity of 0.01 μF, a loss angle of 0.008, and an insulation resistance of 10 TΩ but in which the inclined wall surface and inclined downward extending portion 32a of the dielectric 31 and upper electrode 32 had an inclination of 25° with respect to the top surface of the external leader electrode 4.

COMPARATIVE EXAMPLE 5

A capacitor was manufactured which was similar to that of Embodiment 5, described above, i.e. had a length of 2.0 mm, a width of 1.2 mm, a thickness of about 0.1 mm, a rated voltage of 16 V, an electrostatic capacity of 0.01 μF, a loss angle of 0.008, and an insulation resistance of 10 TΩ but in which the inclined wall surface and inclined downward extending portion 32a of the dielectric 31 and upper electrode 32 had an inclination of 80° with respect to the top surface of the external leader electrode 4.

(Results of Comparisons)

One hundred capacitors of each of Examples 5 to 9 according to Embodiments 5 to 9, respectively, of the present invention were compared with one hundred capacitors of each of Comparative Examples 4 and 5 using heat cycle tests in which the capacitors are heated and cooled quickly between temperatures of −55° C. and 125° C. Table 3, shown below, shows the percentage of capacitors the electrostatic capacity of which decreased by more than 10%.

TABLE 3

Percentage of capacitors the output characteristics of which deviated by more than 10% in the heat cycle tests

| Sample | Inclination | 500 times | 1,000 times | 5,000 times | 10,000 times |
|---|---|---|---|---|---|
| Example 5 | 0.25 | 0% | 0% | 0% | 0% |
| Example 6 | 0.43 | 0% | 0% | 0% | 1% |
| Example 7 | 0.25 | 0% | 0% | 0% | 0% |
| Example 8 | 7 | 0% | 0% | 0% | 2% |
| Comparative Example 4 | 80 | 1% | 9% | 20% | 46% |
| Comparative Example 5 | 25 | 0% | 1% | 1% | 4% |

Further, in tests for another performance, the 100 capacitors of each of Examples 4 to 9 and the 100 capacitors of each of Comparative Examples 4 and 5 were charged and discharged at a test voltage of 16 V and a series resistance of 0.1 Ω. Table 4, shown below, shows the percentage of capacitors that exhibited, in this experiment, an electrostatic capacity corresponding to the destruction of one layer of the upper electrode, vs. the number of times that charge and discharge tests were repeated.

TABLE 4

Percentage of capacitors that exhibited an electrostatic capacity corresponding to the destruction of one layer of the upper electrode, vs. the number of times that charge and discharge tests were repeated

| Sample | Inclination | 5,000 times | 10,000 times | 50,000 times | 100,000 times |
|---|---|---|---|---|---|
| Example 5 | 0.25 | 0% | 1% | 1% | 5% |
| Example 6 | 0.43 | 0% | 4% | 6% | 12% |
| Example 7 | 0.25 | 0% | 0% | 0% | 0% |
| Example 8 | 7 | 0% | 0% | 1% | 3% |
| Example 9 | 20 | 0% | 1% | 2 | 7% |
| Comparative Example 4 | 80 | 10% | 25% | 50% | 90% |
| Comparative Example 5 | 25 | 2% | 5% | 8% | 15% |

The results of experiments shown in Tables 3 and 4 indicate that the inclination of the corners 32c, 32d, 34c, and 34d of the upper electrodes 32 and 34 relates to the electric connectivity in the heat cycle tests and to the current resistance, the electric connectivity in the charge and discharge tests. The mechanism of the phenomenon in which the upper electrode 32 or 34 is cut is assumed to be as follows: An increase in the number of upper electrodes 32 and 34 and dielectrics 31 and 33 stacked may cause the mask position to shift, and a concave and a convex in each layer on the top surface side additionally act on the mask position to make the shift excessive. In particular, if the side portions (corners) of the electrodes and dielectrics have an inclination of 20° or more, the side portions of the upper electrode 34 and dielectric 33, which belong to the uppermost layer, have an inclination of 90°. Accordingly, the upper electrode 34 is imperfectly formed. In particular, if a large number of layers are stacked together, the inclined surface of the upper electrode in the top layer has an increased inclination to cause misalignment of adjacent column crystals constituting the vapor-deposited electrode. This shifts the positions at which the inclination of the dielectric 33 starts and ends to create a concave and a convex. Accordingly, the inclination changes rapidly to increase the probability that it appears larger. Then, repeated contraction and expansion occurring at low and high temperatures, respectively, makes it prone to concentrate stress to destroy the corner 34c or 34d of the upper electrode 34, or an instantaneous large current induces migration to destroy the corner 34c or 34d of the upper electrode 34. Thus, according to the embodiments of the present invention, the upper electrode 34 is stably provided with current resistance to provide a capacitor with excellent characteristics.

Similar excellent characteristics were obtained by injecting styrene and butadiene mixed at a weight ratio of 1:1, under a silicon dioxide film as the protective layer 8 and copolymerizing the mixture with an organic peroxide to form a film of thickness 20 μm.

Further, in the description of the capacitors of Examples 5 to 9 according to the above described embodiments, the inclined wall surfaces of the dielectrics 31 and 33 all have an inclination between 0.1 and 20° with respect to the top surface 4b of the external leader electrode 4. In this case, the entire inclined downward extending portions 32a and 34a of the upper electrodes 32 and 34, respectively, extending along the inclined wall surfaces of the dielectrics 31 and 33, have a substantially equivalent inclination with respect to the top surface 4b of the external leader electrode 4. This substantially perfectly prevents cracking to provide a very reliable capacitor. However, the present invention is not limited to this aspect. The inclined wall surfaces of the dielectrics 31 and 33 may each be partly provided with a portion extending from the lower end to upper end of the inclined wall surface and having an inclination α between 0.1 and 20° with respect to the top surface 4b of the external leader electrode 4. Also in this case, the portion inclined gently so as to extend from lower end to upper end is prevented from cracking. Therefore, the conductive state can be maintained appropriately.

Further, as described in Embodiments 1 and 5, by filling the insulator 11 into the gap 3 between the external leader electrode 4 and the lower electrode 5, the height of the step in this area can be reduced to eliminate corners that may cause stress concentration or allow the corners to incline gently. Even if a small step is created, the upper electrode is stably provided with current resistance to provide a capacitor with excellent characteristics, provided that the corners of the dielectric and upper electrode formed over the insulator 11 filling the gap 3 between the external leader electrode 4 and the lower electrode 5 have an inclination between −20 and 20°.

Figure 14:
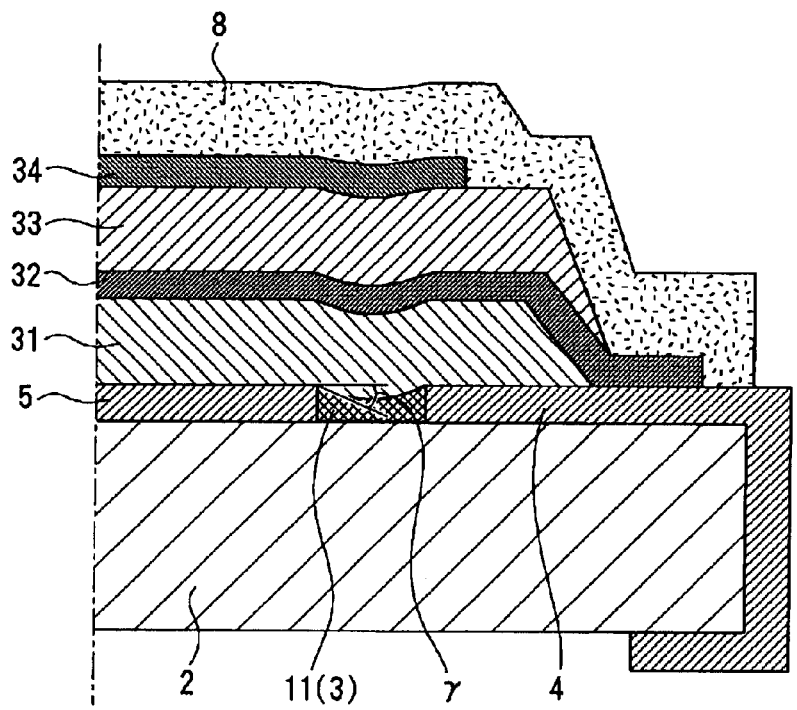
FIG. 14 is an enlarged sectional view of an essential part of a capacitor according to another embodiment of the present invention.
Figure 15:
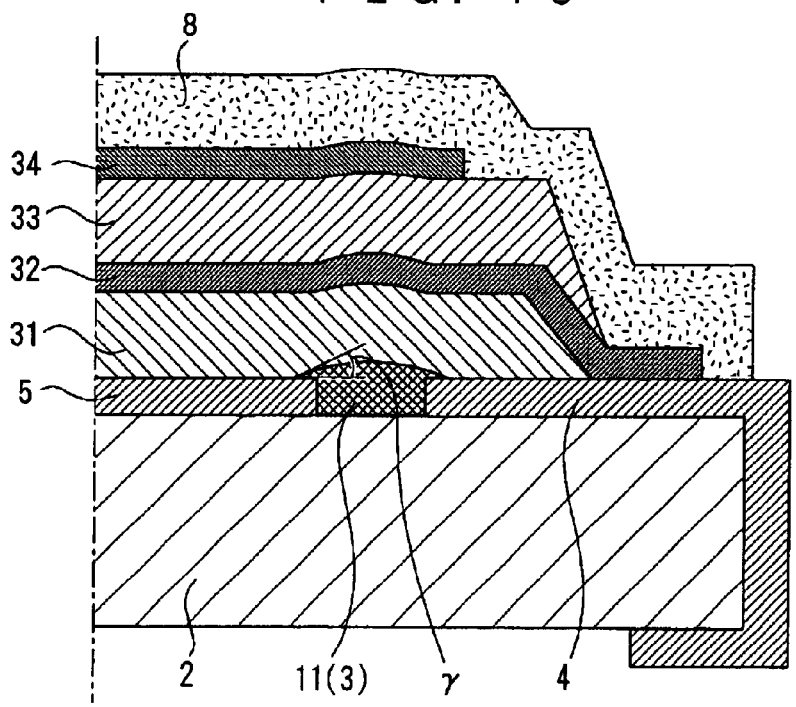
FIG. 15 is an enlarged sectional view of an essential part of a capacitor according to yet another embodiment of the present invention.

Further, in this case, it is most desirable that the corners of the dielectric and upper electrode formed to face the insulator 11 filling the gap 3 between the external leader electrode 4 and the lower electrode 5 all have an inclination between −20 and 20°. However, the present invention is not limited to this aspect. A part of each of the corners of the dielectric and the upper electrode formed to face the insulator 11 filling the gap 3 between the external leader electrode 4 and the lower electrode 5 may have a downward inclination γ between 0 and 20° as shown in FIG. 14 or between 0 and −20° (i.e. the insulator is filled so as to protrude slightly from the external leader electrode 4 and the lower electrode 5) as shown in FIG. 15. The corner has only to extend from the lower end to upper end of the inclined surface at an inclination between −20 and 20° (furthermore, even if a plurality of concaves and convexes are present, e.g. the protruding portion inclines downward, all these portions have only to extent at an inclination between −20 and 20°). Also in this case, the areas of the first and second upper electrodes 32 and 34 which correspond to these portions are each provided with a gently inclined portion. This prevents cracking in these portions to enable the conductive state to be maintained.

Embodiment 10

As the first and second dielectrics 31 and 33 according to Embodiment 5, polymers of thickness 0.3 μm are used which are obtained by irradiating monomer vapors of divinylbenzene with a 10-keV electron line. Then, a capacitor was manufactured which had an inclination of about 0.25° on the external leader electrode 4 and had a length of 2.0 mm, a width of 1.2 mm, a thickness of about 0.1 mm, a rated voltage of 16 V, an electrostatic capacity of 0.001 μF, a loss angle of 0.001, and an insulation resistance of 10 TΩ. For charge and discharge tests, this capacitor produced good results similar to those produced by the capacitor of Example 5 according to Embodiment 5.

Further, similar good results were produced by using divinylbiphenyl or divinylnaphthalate as monomer vapors in place of divinylbenzene.

Furthermore, similar good results were obtained by using, as material for the flexible substrate 2, polyimide obtained by combining aromatic dianhydride and aromatic diamine together.

Embodiment 11

Figure 16:
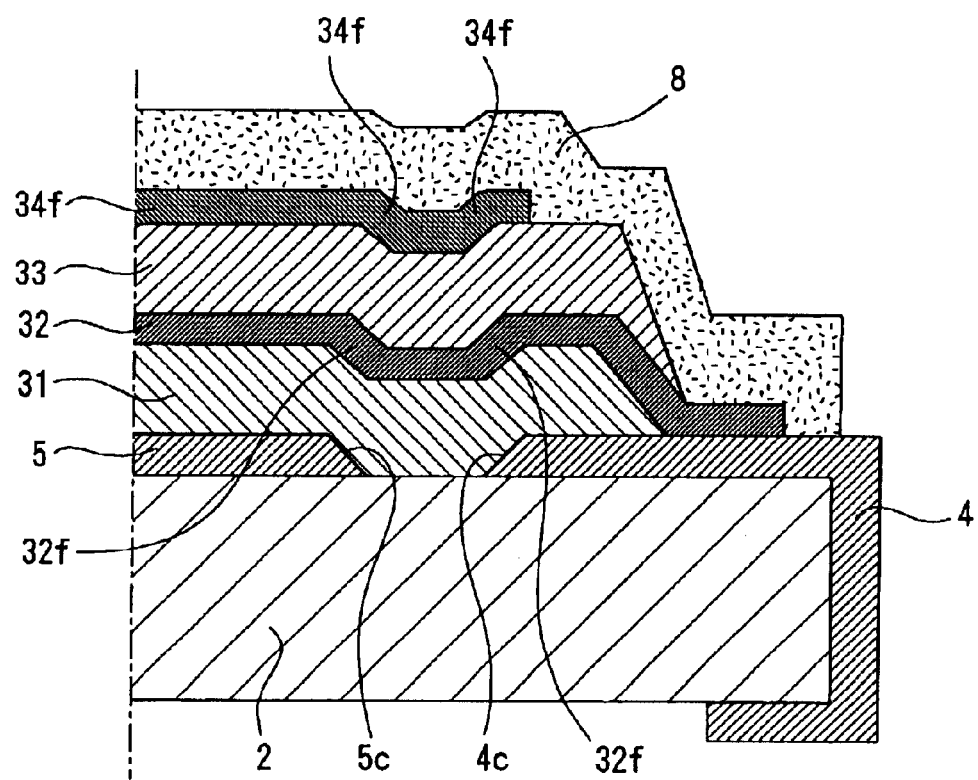
FIG. 16 is an enlarged sectional view of an essential part of a capacitor according to an eleventh embodiment of the present invention.

In any of the above described embodiments, the insulator 11 fills the gap 3 between the external leader electrode 4 and the lower electrode 5. In this embodiment, as shown in FIG. 16, the insulator 11 is not filled into the gap 3. Those end surfaces 4c and 5c of the external leader electrode 4 and the lower electrode 5, respectively, which face the gap 3 are inclined at an angle between 0.1 and 20° with respect to the top surface of the flexible substrate 2 so that the size of the gap increases upward.

With this arrangement, those areas of the dielectrics 31 and 33 and upper electrodes 32 and 34 which correspond to the gap 3 are slightly depressed. However, even in this case, the inclined surfaces 32f and 34f of the corresponding upper electrode 32 and 34, respectively, are inclined gently at an angle between about 0.1 and 20°. Consequently, this arrangement also prevents the upper electrodes 32 and 34, corresponding to these areas, from cracking to enable the conductive state to be maintained appropriately.

In this regard, the entire areas of the end surfaces 4c and 5c of the external leader electrode 4 and the lower electrode 5, respectively, which face the gap 3 need not be inclined at an angle between 0.1 and 20° with respect to the top surface of the flexible substrate 2 so that the size of the gap increases upward. The area of each of the end surfaces 4c and 5c of the external leader electrode 4 and the lower electrode 5, respectively, which face the gap 3 has only to be partly inclined at an angle between 0.1 and 20° with respect to the top surface of the flexible substrate 2. Further, this gently inclined surface has only to extend from, the lower end to upper end of the end surface 4c or 5c. That is, also in this case, the areas of the upper electrodes 32 and 34 which correspond to the gap are provided with the gently inclined portions. This prevents these areas from cracking to enable the conductive state to be maintained appropriately.

Embodiment 12

Figure 17:
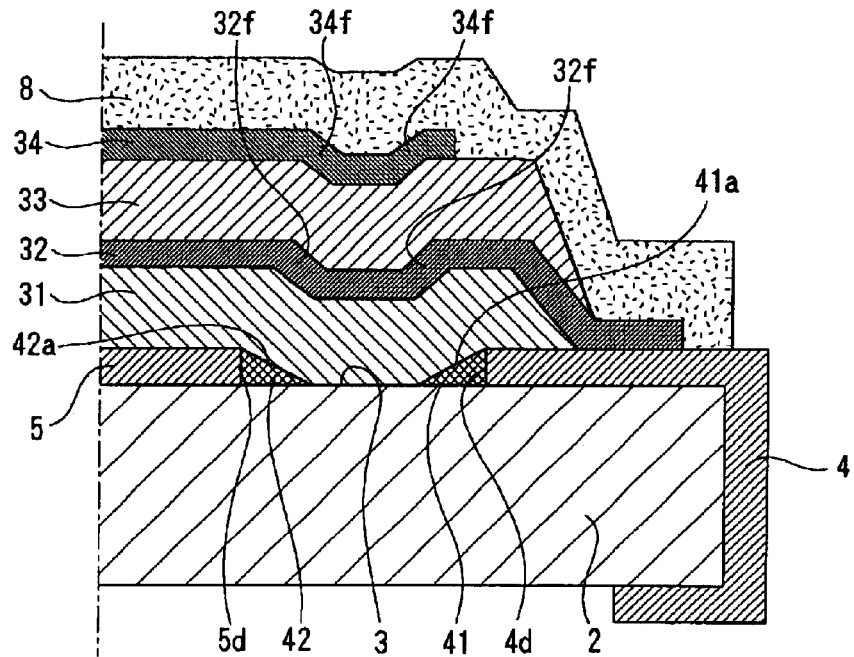
FIG. 17 is an enlarged sectional view of an essential part of a capacitor according to a twelfth embodiment of the present invention.

In this embodiment, end surfaces 4d and 5d of the external leader electrode 4 and the lower electrode 5 which face the gap 3 are shaped to extend substantially perpendicularly to the top surface of the flexible substrate 2. However, as shown in FIG. 17, an insulator 41 is filled into the corner between the end surface 4d of the external leader electrode 4 facing the gap 3 and an area of the flexible substrate 2 which is close to the end surface 4d so that the wall surface of the insulator is inclined. On the other hand, an insulator 42 is filled into the corner between the end surface 5d of the lower electrode 5 facing the gap 3 and an area of the flexible substrate 2 which is close to the end surface 5d so that the wall surface of the insulator is inclined. Inclined surfaces 41a and 42a of the insulators 41 and 42, respectively, have a downward inclination of 20° or less with respect to the top surface of the flexible substrate 2.

Also with this arrangement, the inclined surfaces 41a and 42a of the insulators 41 and 42, respectively, serve to very gently incline the inclined surfaces 32f and 34f of the upper electrodes 32 and 34, respectively, located above the gap 3 at an angle of 20° or less. Consequently, this arrangement also prevents cracking of those corners of the inclined surfaces 32f and 34f of the upper electrodes 32 and 34, respectively, which correspond to the gap, to enable the conductive state to be maintained appropriately.

Figure 18:
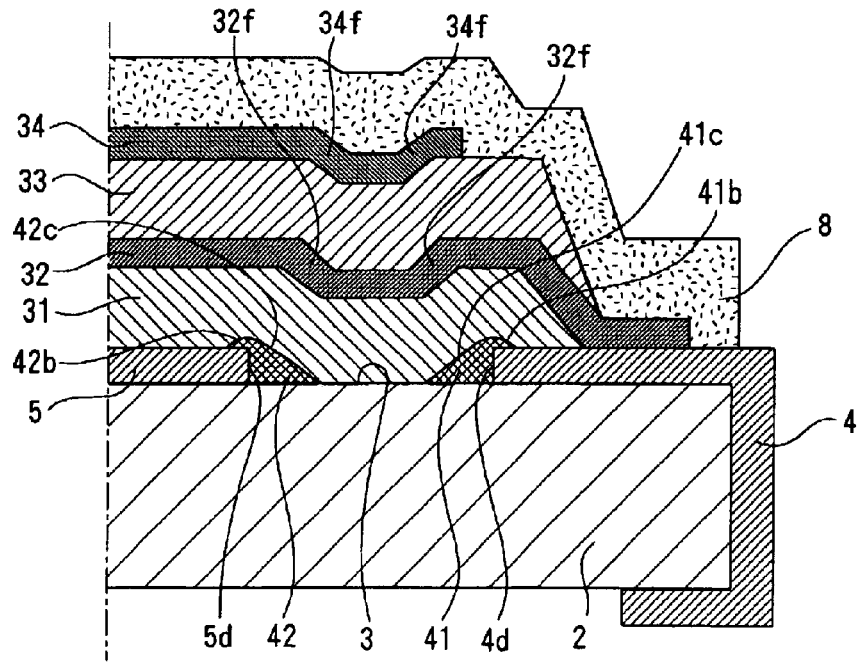
FIG. 18 is an enlarged sectional view of an essential part of another capacitor according to the twelfth embodiment of the present invention.

Further, also in this case, the entire areas of the inclined surfaces 41a and 42a of the insulators 41 and 42, respectively, need not be inclined at an angle between 0.1 and 20° with respect to the top surface of the flexible substrate 2. Each of the insulators 41 and 42 has only to be provided with an inclined surface partly inclined within the above angle range and extending from lower end to upper end so as to incline gently. Further, as shown in FIG. 18, the insulators 41 and 42 may be formed to partly protrude from the external leader electrode 4 or the lower electrode 5. Protruding inclined portions 41b and 42b and inclined portions 41c and 42c inclining downward from the inclined portions 41b and 42b, respectively, have only to have inclinations of 20° or less with respect to the top surface of the flexible substrate 2.

Embodiment 13

Figure 28:
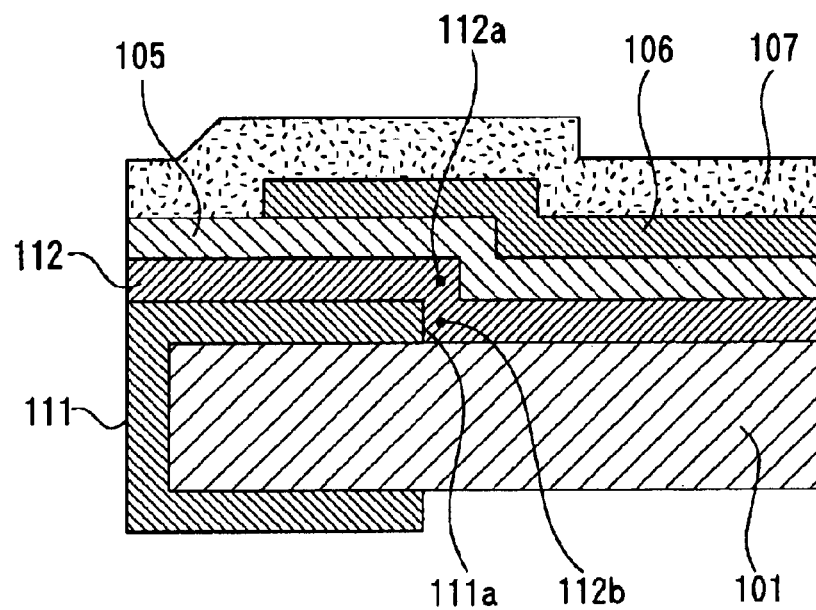
FIG. 28 is an enlarged sectional view of an essential part of yet another conventional capacitor, which is useful in describing how to solve problems with this capacitor.

Further, in the description of any of the above embodiments, the lower electrode has the functions of the external leader electrode. However, the present invention is not limited to this aspect but is of course applicable to the case in which a lower-electrode-connected external leader electrode 51 is provided separately from the lower electrode 5. However, in this case, as also described in the prior art section (see FIGS. 25 and 28), the end surface 111a of the external leader electrode 111, to which the lower electrode 112 is connected is formed, to extend substantially perpendicularly to the flexible substrate 101. Accordingly, if the lower electrode 112 is simply formed along the end surface 111a of the external leader electrode 111, then the corners 112a and 112b of the lower electrode 112 formed at positions where they face the end surface 111a of the external leader electrode 111 are also bent at an angle close to the right angle. Stress is prone to concentrate on these bent portions.

Figure 19:
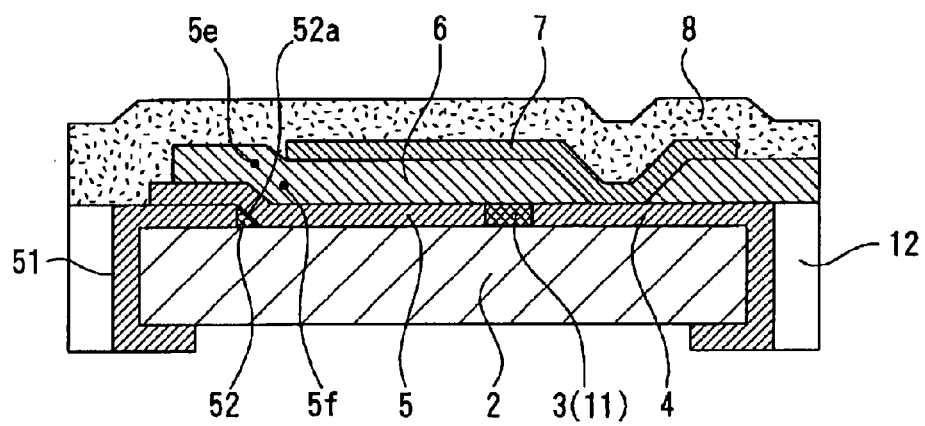
FIG. 19 is a sectional view of a capacitor according to a thirteenth embodiment of the present invention.

To deal with this, the capacitor according to this embodiment is formed as follows. As shown in FIG. 19, an insulator 52 having the inclined surface 52a is filled into a corner of the flexible substrate 2 which faces an end surface portion of a lower-electrode-connected external leader electrode 51. Further, the inclined surface 52a of the insulator 52 has an inclination between 0.1 and 20° with respect to the flexible substrate 2 (however, FIG. 19 shows that the capacitor has a single layer of the upper electrode 7).

With this arrangement, when the lower electrode 5 is formed to cover the lower-electrode-connected external leader electrode 51 and the insulator 52 from above, corners 5e and 5f of lower electrode 5 which are located close to the insulator 52 are inclined very gently at an angle between 0.1 and 20° (for the upper corner 5e, a downward inclination with respect to the top surface of an area of the lower electrode 5 which covers the external leader electrode 51; for the lower corner 5f, an upward inclination with respect to the top surface of the flexible substrate 2), which is substantially similar to the inclination of the insulator 52. Accordingly, even if a thin product using this capacitor is subjected to vibration or the like and thus relatively small external stress (external force) or stress is caused by a difference in expansion coefficient among the component materials in connection with temperature, stress concentration on the corners 5e and 5f is reduced to prevent cracking.

Further, also in this case, in the entire area in which the insulator 52 is filled, the inclined surface 52a formed on the insulator 52 need not be inclined at an angle between 0.1 and 20° with respect to the top surface of the flexible substrate 2. The inclined surface 52a has only to be partly provided with a portion extending from the lower end to upper end of the inclined surface 52a at an inclination between 0.1 and 20°.

Furthermore, as shown in FIG. 18, the insulator 52 may be partly formed to protrude from the external leader electrode 4 and the lower electrode 5. The protruding inclined portion and the inclined portion inclining downward from the protruding inclined portion have only to have an inclination within the above angle range. That is, the insulator 52 has only to have a downward inclination of ±20° with respect to the top surface of area of the lower electrode 5 which covers the external leader electrode 51.

Figure 20:
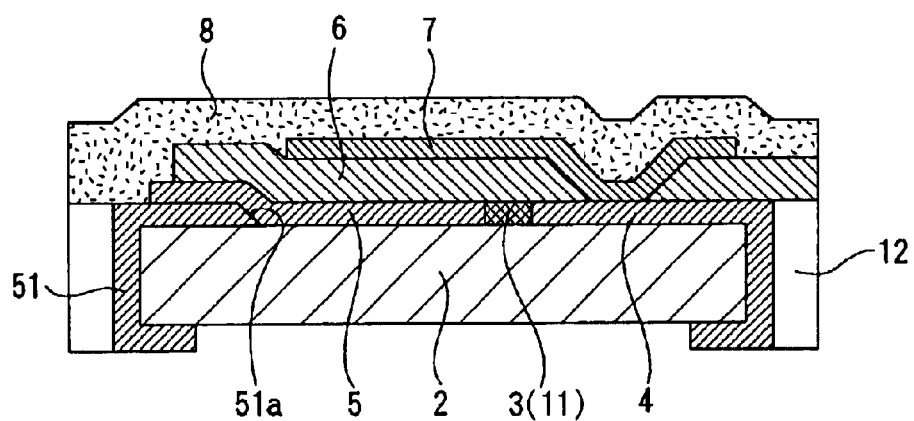
FIG. 20 is a sectional view of another capacitor according to the thirteenth embodiment of the present invention.

Furthermore, instead of providing the insulator 52, the end of the external leader electrode 51 which corresponds to this area may be inclined so that an inclined surface 51a of this end has an inclination between 0.1 and 20° with respect to the top surface of the flexible substrate 2 as shown in FIG. 20. Also in this case, the entire area of end inclined surface 51a of the external leader electrode 51 need not be inclined at an angle between 0.1 and 20° with respect to the top surface of the flexible substrate 2. The external leader electrode 51 has only to be provided with an end inclined surface 51a partly inclined within the above angle range and extending from lower end to upper end so as to incline gently.

Embodiment 14

Figure 21:
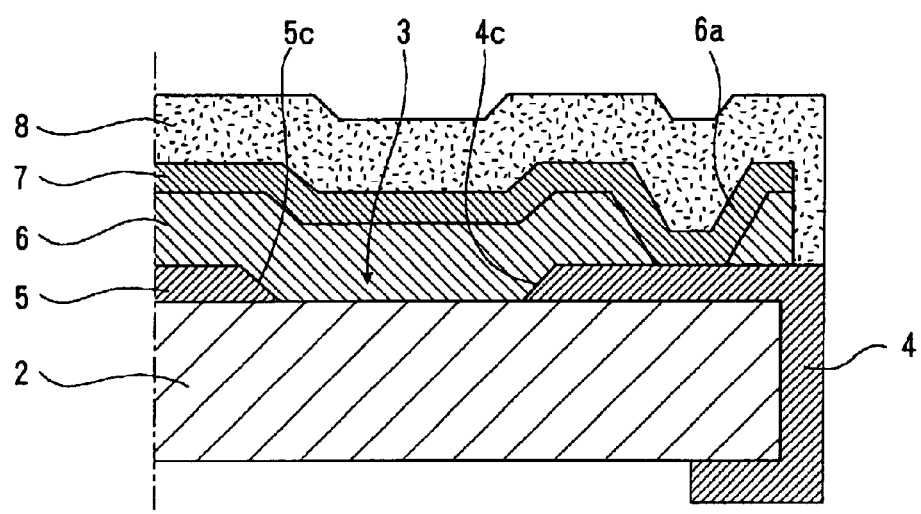
FIG. 21 is a sectional view of a capacitor according to a fourteenth embodiment of the present invention.
Figure 22:
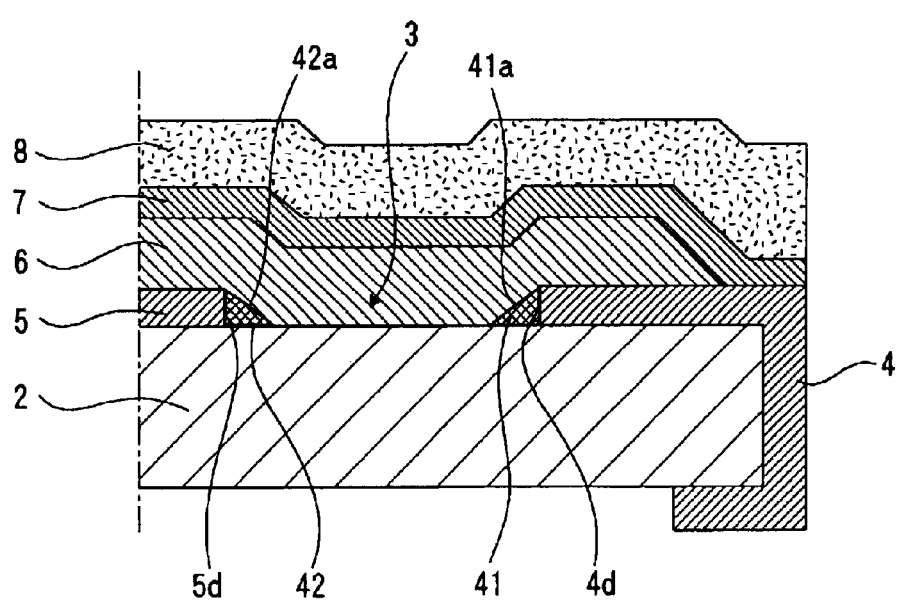
FIG. 22 is a sectional view of another capacitor according to the fourteenth embodiment of the present invention.

This embodiment shows the case where a larger gap 3 is formed between the upper-electrode-connected external leader electrode 4 and the lower electrode 5 as shown in FIGS. 21 and 22 (however, in this embodiment, a single layer of the upper electrode is provided).

However, also in this embodiment, as described in Embodiment 11, described above, the end surfaces 4c and 5c of the external leader electrode 4 and the lower electrode 5, respectively, which face the gap 3 may be at least partly shaped to incline at an angle between 0.1 and 20° with respect to the top surface of the flexible substrate 2 so that the size of the gap increases upward, as shown in FIG. 21. Alternatively, as shown in FIG. 22 and as described in Embodiment 12, described above, the insulator 41, 42 may be filled into the corner between the end surface portion 4d, 5d of the external leader electrode 4 or the lower electrode 5, respectively, facing the gap 3 and the area of the flexible substrate 2 which is close to the end surface 4d, 5d so that the wall surface of the insulator is inclined. Further, the inclined surface 41a, 42a formed on the insulator 41, 42, respectively, may at least partly have an inclination of ±20° or less with respect to the top surface of the flexible substrate 2.

Thus, also in this case, that area of inclined surface of the upper electrode 7 which corresponds to the end of the external leader electrode 4 and that area of inclined surface of the upper electrode 7 which corresponds to the end of the lower electrode 5 are inclined very gently at an angle between 0.1 and 20°. This prevents the portions of the upper electrode 7 corresponding to these areas from cracking to enable the conductive state to be maintained appropriately.

The area in which the upper electrode 0.7 is connected to the external leader electrode 4 may be formed so that the inclined surface of the hole portion formed in an area of the dielectric 6 which is close to the connecting section between the external leader electrode 4 and the upper electrode 7 or has an inclination between 0.1 and 20° as described in Embodiment 1, as shown in FIG. 21, or the wall surface of the inclined end of the dielectric 6 has an inclination between 0.1 and 20° as shown in FIG. 22. Then, areas of the upper electrode 7 which are close to the connecting section can be formed to incline gently. In such a case, the upper electrode 7 has only to be at least partly provided with a gently inclined surface.

That is, also in this case, the areas of the upper electrode 7 corresponding to the connecting section are provided with the gently inclined portions. This prevents cracking in these areas to enable the conductive state to be maintained.

Further, in the description of Embodiments 1 to 4, described above, the dielectric is formed by sticking a film-like dielectric 6. In the description of Embodiments 5 to 10, described above, the dielectrics 31 and 33 are formed by vapor deposition. However, the present invention is not limited to this aspect. It should be appreciated that the dielectric may be formed by vapor deposition in Embodiments 1 to 4, described above, or that the dielectric may be formed by sticking a film-like dielectric in Embodiments 5 to 10, described above.

Furthermore, in the capacitors according to the above described embodiments, the upper electrode may be subjected to laser trimming to form on the protective layer a thicker coating layer. Alternatively, the surface of the protective layer may be coated with nickel or copper and nickel so, as to form a two-layer structure. This structure serves to achieve electromagnetic shielding easily. A feed-through capacitor structure is obtained by electrically connecting the coating layer to one of the electrodes. This serves to provide a product that reduces noise or is unlikely to be affected by noise, thus providing excellent performance and characteristic stability.

As described above, according to the present invention, a capacitor using a flexible substrate is formed so that a hole portion formed in a dielectric to connect an upper electrode to an external leader electrode at least partly extends from its lower end to upper end at an inclination between 0.1 and 20° with respect to the top surface of the external leader electrode. Then, the upper end corner of inclined wall surface of the upper electrode, which inclines along the hole portion of the dielectric, has a downward inclination between 0.1 and 20°. The lower end corner of inclined wall surface of the upper electrode, which inclines along the hole portion of the dielectric, has an upward inclination between 0.1 and 20°. As a result, stress concentration on the above corners of the upper electrode is drastically reduced to prevent the upper electrode from cracking. This enables this capacitor to be used in a very thin product together with a flexible structure, while allowing a sheet-like capacitor, which is conventionally easily affected by stress, to withstand high mechanical and electric stress. Therefore, appropriate reliability is obtained.

Further, in a capacitor using a flexible substrate, an end wall surface of a dielectric which is located above an external leader electrode is formed to incline from a side that faces the bottom surface of an upper electrode to a side that faces the top surface of the external leader electrode so that the wall surface of inclined end of the dielectric has an inclination between 0.1 and 20° with respect to the top surface of the external leader electrode. Then, areas of the upper electrode which are close to a connecting section with the external leader electrode are inclined gently at an angle between 0.1 and 20°. As a result, stress concentration on corners of the upper electrode is reduced to prevent the upper electrode from cracking, thus obtaining appropriate reliability.

Further, in a capacitor using a flexible substrate, the wall surface of that end of a dielectric located immediately below an upper electrode which faces a downward extending portion is formed to incline from a side that faces the bottom surface of the upper electrode to a side that faces the top surface of an external leader electrode or a lower electrode so that the wall surface of inclined end of each dielectric has an inclination between 0.1 and 20° with respect to the top surface of the external leader electrode or lower electrode. Corners of the upper electrode which are close to a connecting section with the external leader electrode are inclined gently at an angle between 0.1 and 20°. As a result, stress concentration on the corners of the upper electrode is reduced to prevent the upper electrode from cracking, thus obtaining appropriate reliability.

Furthermore, in a capacitor using a flexible substrate, an insulator is filled into the gap between an external leader electrode and a lower electrode. This eliminates corners from those areas of a dielectric and an upper electrode which correspond to the gap or allows the corners to incline gently. This eliminates or reduces stress concentration on the corners to prevent the upper electrode from cracking, thus obtaining appropriate reliability.

Moreover, in a capacitor using a flexible substrate, those end surfaces of an upper-electrode-connected external leader electrode and a lower electrode which face the gap between the external leader electrode and the lower electrode are shaped to incline at an angle between 0.1 and 20° with respect to the top surface of the flexible substrate so that the size of the gap increases upward. Further, a dielectric and an upper electrode are formed along the inclined end surfaces of the external leader electrode and the lower electrode. Then, corners of the dielectric and upper electrode which correspond to the gap are inclined gently. As a result, stress concentration on the corners is reduced to prevent the upper electrode from cracking, thus obtaining appropriate reliability.

Further, in a capacitor using a flexible substrate, insulators are filled into two respective corners each of which is located between an end surface portion of an upper-electrode-connected external leader electrode or a lower electrode which faces the gap between the external leader electrode and the lower electrode and an area of the flexible substrate which is close to the end surface portion. The insulators are disposed so that their end surfaces are inclined at an angle between 0.1 and 20° with respect to the flexible substrate. Accordingly, corners of the dielectric and upper electrode which correspond to the gap are inclined gently. As a result, stress concentration on the corners is reduced to prevent the upper electrode from cracking, thus obtaining appropriate reliability.

Furthermore, in a capacitor using a flexible substrate, an insulator is filled into a corner of the flexible substrate which faces an end surface portion of a lower-electrode-connected external leader electrode. The insulator is provided with an inclined surface having an inclination between 0.1 and 20° with respect to the flexible substrate. Accordingly, a corner of the lower electrode which corresponds to the gap is inclined gently. As a result, stress concentration on the corner is reduced to prevent the lower electrode from cracking, thus obtaining appropriate reliability.

Moreover, with these arrangements, the height of a step is reduced in all areas to allow the layers to incline gently, thus preventing a protective layer from being damaged. This results in stable humidity resistance and a reduced and stable amount of moisture absorbed by the components. Further, the capacitor is stable after trimming to provide a very stable product.

What is claimed is:

1. A capacitor, comprising:

a flexible substrate;

an external leader electrode connecting to an upper electrode and a lower electrode located on said flexible substrate with a gap between said electrodes so that electrodes are not electrically connected to each other;

a dielectric extending over a top surface of said external leader electrode and a top surface of said lower electrode; and an upper electrode located opposite said lower electrode and extending across said dielectric, wherein:

said dielectric has a hole portion comprising a surface that inclines from a side that faces a bottom surface of said upper electrode to a side that faces the top surface of said external leader electrode, said hole portion has an inclined wall surface having at least partly a portion extending from a lower end to an upper end of the inclined wall surface at an inclination between 0.1 and 20° with respect to the top surface of said external leader electrode, and said upper electrode is recessed at a portion located along the inclined wall surface of the hole portion of said dielectric, thereby connecting the top surface of said external leader electrode.

2. The capacitor according to claim 1, wherein the inclined wall surface of the hole portion of the dielectric comprises a portion inclined relative to the external leader electrode from an upper end corner of the portion and inclined relative to the external leader electrode from a lower end corner of the portion respectively at an inclination between 0.1 and 20° with respect to the top surface of said external leader electrode.

3. The capacitor according to claim 1, wherein the hole portion of the dielectric penetrates the dielectric in an inverted cone or pyramid form from a side that faces the upper electrode toward a side that faces the external leader electrode.

4. The capacitor according to claim 1, wherein the upper electrode comprises an inclined surface inclining along the inclined wall surface of the hole portion of the dielectric, and the inclined surface of the upper electrode has at least partly a portion extending from a lower end to an upper end of the inclined wall surface at an inclination between 0.1 and 20° with respect to the top surface of said external leader electrode.

5. The capacitor according to claim 4, wherein the inclined surface of the upper electrode has a portion inclined relative to the external leader electrode from an upper end corner of the portion and inclined relative to the external leader electrode from a lower end corner of the portion respectively at an inclination between 0.1 and 20° with respect to the top surface of said external leader electrode.

6. The capacitor according to claim 1, wherein said dielectric is comprises a material selected from the group consisting of polyphenylene sulfide, silicon dioxide, divinylbenzene polymer, strontium titanate, syndiotactic polystyrene, cyclic olefin copolymer film, polyphenylene oxide, polybenzocyclobutene polymer, divilnaphthalene polymer, divinylbiphenyl polymer, aluminum oxide, and polyetheretherketone resin, or a mixtures of any of these materials.

7. The capacitor according to claim 1, wherein said flexible substrate comprises a resin film.

8. A capacitor, comprising:
   a flexible substrate;
   an external leader electrode connecting to an upper electrode and a lower electrode located on said flexible substrate with a gap between said electrodes so that said electrodes are not electrically connected to each other;
   a dielectric extending over a top surface of said external leader electrode and a top surface, of said lower electrode; and
   an upper electrode located opposite said lower electrode and extending across said dielectric, wherein:
      at least part of a wall surface of said dielectric located above said external leader electrode and inclining from a side that faces a bottom surface of the upper electrode toward a side that faces a top surface of said external leader electrode,
      the inclined wall surface of said dielectric has at least partly a portion extending from a lover end to an upper end of the inclined wall surface at an inclination between 0.1 and 20° with respect to the top surface of said external leader electrode, and
      said upper electrode is located along the inclined wall surface of said dielectric so that its lower end is connected to the top surface of said external leader electrode.

9. The capacitor according to claim 8, wherein the inclined wall surface of the dielectric has a portion inclined relative to the external leader electrode from an upper end corner of the portion and inclined relative to the external leader electrode from a lower end corner of the portion respectively at an inclination between 0.1 and 20° with respect to the top surface of said external leader electrode.

10. The capacitor according to claim 8, wherein the upper electrode comprises an inclined surface inclining along the inclined wall surface of the dielectric, and the inclined surface of the upper electrode has at least partly a portion extending from a lower end to an upper end of the inclined wall surface at an inclination between 0.1 and 20° with respect to the top surface of said external leader electrode.

11. The capacitor according to claim 10, wherein the inclined surface of the upper electrode has a portion inclined relative to the external leader electrode from an upper end corner of the portion and inclined relative to the external leader electrode from a lower end corner of the portion respectively at an inclination between 0.1 and 20° with respect to the top surface of said external leader electrode.

12. A capacitor, comprising:
   a flexible substrate;
   an external leader electrode connecting to an upper electrode and a lower electrode located on said flexible substrate with a gap between said electrodes, so that said electrodes are electrically connected to each other;
   a plurality of dielectrics;
   a plurality of upper electrodes comprising a plurality of layers above said lover electrode via respective said dielectrics, each electrode layer being connected to the external leader electrode or the lover electrode via extending portion inclining relative to the external leader electrode and extending toward the external leader electrode or the lower electrode and via a connecting section, wherein:
      a wall surface of the dielectric facing said inclined extending portion and located immediately below each upper electrode inclines relative to the external leader electrode from a side that faces a bottom surface of the upper electrode to a side that faces a top surface of said external leader electrode or said lower electrode, and
      the inclined wall surface of each dielectric has at least partly a portion extending from a lower end to an upper end of the inclined wall surface at an inclination between 0.1 and 20° with respect to the top surfaces of said external leader electrode and said lower electrode.

13. The capacitor according to claim 12, wherein the inclined wall surface of each dielectric has a portion inclined relative to the external leader electrode from an upper end corner thereof called an inclined downward extending portion and inclined relative to the external leader electrode from a lower end corner thereof called an inclined upward extending portion respectively at an inclination between 0.1 and 20° with respect to the top surfaces of said external leader electrode and said lower electrode.

14. The capacitor according to claim 12, wherein the inclined downward extending portion of each upper electrode has at least partly a portion extending from a lower end to an upper end of the inclined downward extending portion at an inclination between 0.1 and 20° with respect to the top surfaces of said external leader electrode and said lower electrode.

15. The capacitor according to claim 14, wherein the inclined downward extending portion of each upper electrode has a portion inclined from an upper end corner thereof at an inclination between 0.1 and 20° and a portion inclined from a lower end corner thereof at an inclination between 0.1 and 20° with respect to the top surfaces of said external leader electrode and said lower electrode.

16. A capacitor, comprising:
   a flexible substrate;
   an external leader electrode connecting to an upper electrode and a lover electrode located on said flexible substrate with a gap between said electrodes so that said electrodes are not electrically connected to each other;
   a dielectric made of a first material and extending over a top surface of said external loader electrode and a top surface of said lower electrode;
   an upper electrode arranged opposite said lover electrode and extending across said dielectric and electrically connected to said external leader electrode; and
   an insulator made of a second material and filling said gap between said external leader electrode and said lover electrode, said first and second materials being different from each other,
   wherein
   said dielectric also covers said insulator.

17. The capacitor according to claim 16, wherein portions of the dielectric over the insulator filling the gap and portions of the dielectric contacting the top surfaces of the external leader electrode and the lower electrode have a surface having at least partly an inclination of ±20° relative to a top surface of the external leader electrode.

18. The capacitor according to claim 16, wherein said insulator is made of resin.

19. A capacitor, comprising:
a flexible substrate;
an external leader electrode connecting to an upper electrode and a lover electrode located on said flexible substrate with a gap between said electrodes so that said electrodes are not electrically connected to each other;
a dielectric extending over a top surface of said external leader electrode and a top surface of said lower electrode; and
an upper electrode located opposite said lower electrode and extending across said dielectric and electrically connected to said external leader electrode, wherein:
  each and surface facing said gap between said external leader electrode and said lower electrode is inclined relative to a top surface of the flexible substrate,
  an inclined end surface of said external leader electrode and an inclined end surface of said lower electrode each have at least partly a portion extending from a lower end to an upper end of the inclined end surface at an inclination between 0.1 and 20° with respect to the top surface of the flexible substrate, and
  the dielectric and the upper electrode are located along the inclined end surface of the external leader electrode and the lower electrode.

20. A capacitor, comprising:
a flexible substrate;
an external leader electrode connecting to an upper electrode and a lower electrode formed on said flexible substrate with a gap between said electrodes so that said electrodes are not electrically connected to each other;
insulators located in two corners in ouch a and having inclined wall surfaces thereon, said two corners being located between an end surface portion of said external leader electrode and the flexible substrate and between an end surface portion of said lower electrode and the flexible substrate, respectively, each said end surfaces facing said gap, said filled insulators having at least partly a portion extending from a lower end to an upper end of the inclined surface, said portion having an inclination between 0.1 and 20° with respect to a top surface of said flexible substrate and an inclination of ±20° with respect to top surfaces of said external leader electrode and lower electrode;
a dielectric located to extend over a top surface of said external leader electrode and a top surface of said lower electrode; and
an upper electrode located opposite said lower electrode and extending across said dielectric and electrically connected to said external leader electrode.

21. A capacitor, comprising:
a flexible substrate;
an external leader electrode located on said flexible substrate and connecting to a lower electrode;
an external leader electrode located on said flexible substrate and connecting to an upper electrode;
an insulator filling a corner of said flexible substrate, said insulator facing an end surface portion of said external leader electrode, said insulator having at least partly a portion extending from a lower end to an upper end of an inclined surface of the insulator and having an inclination between 0.1 and 20° with respect to a top surface of said flexible substrate and an inclination of ±20° with respect to a top surface of said external leader electrode connecting to the lower electrode;
a lower electrode extending across a neighborhood of the end surface portion of said external leader electrode connecting to the lower electrode, the inclined surface of said insulator, and an external exposed surface of the flexible substrate;
a dielectric located on said lower electrode; and
an upper electrode located opposite said lower electrode extending across said dielectric and electrically connected to said external leader electrode connecting to the upper electrode.

22. A method of manufacturing a capacitor, comprising:
forming an external leader electrode connecting to an upper electrode and a lover electrode on a flexible substrate with a gap between said electrodes so that said electrodes are not electrically connected to each other;
forming a dielectric to extend over a top surface of the external leader electrode and a top surface of the lower electrode;
forming a hole portion through the dielectric at a position corresponding to the external leader electrode so that at least part of a wall surface of the hole portion inclines, and, at the same time, forming the inclined surface to have at least partly a portion extending from a lover end to an upper end of the inclined wall surface at an inclination between 0.1 and 20° with respect to the top surface of said external leader electrode; and forming the upper electrode on the dielectric including the hole portion, thereby electrically connecting the upper electrode to the external leader electrode.

23. The capacitor manufacturing method according to claim 22, wherein forming a hole portion comprises allowing a plasma stream to pass through a hole in mask spaced at a predetermined distance from the dielectric.

24. The capacitor manufacturing method according to claim 23, wherein forming a hole portion comprises allowing a plasma stream to pass through the hole in the mask while moving the mask.

25. The capacitor manufacturing method according to claim 22, wherein forming a hole portion, comprises interposing a spacer between the mask and the dielectric.

26. The capacitor manufacturing method according to claim 25, wherein the spacer comprises a material selected from the group consisting of polyethylene terephthalate or polyethylene naphthalate or a mixture of these materials.

27. The capacitor manufacturing method according to claim 22, wherein said forming the dielectric comprises sticking a film-like dielectric.

28. The capacitor manufacturing method according to claim 22, wherein said forming the dielectric comprises deposition.

29. A method of manufacturing a capacitor, comprising:
forming an external leader electrode connecting to an upper electrode and a lower electrode on a flexible substrate with a gap between said electrodes, so that said electrodes are not electrically connected to each other;
forming a dielectric to extend over a top surface of the external leader electrode and a top surface of the lower electrode;

forming an inclined wall surface on the dielectric at a position corresponding to the external leader electrode and, at the same time, forming the inclined wall surface to have at least partly a portion extending from a lower end to an upper end of the inclined wall surface at an inclination between 0.1 and 20° with respect to the top surface of said external leader electrode; and forming the upper electrode on the dielectric including the inclined wall surface, thereby electrically connecting the upper electrode to the external leader electrode.

30. The capacitor manufacturing method according to claim 29, further comprising providing a mask, wherein forming the inclined wall surface of the dielectric, comprises performing sputtering with a predetermined space provided between the mask and the dielectric.

31. The capacitor manufacturing method according to claim 30, wherein forming the inclined end wall surface of the dielectric, comprises interposing a spacer between the mask and the dielectric.

32. The capacitor manufacturing method according to claim 30, wherein forming the inclined end wall surface of the dielectric comprises performing sputtering while said mask is being moved.

33. A method of manufacturing a capacitor, comprising:
forming an external leader electrode connecting to an upper electrode and a lower electrode on a flexible substrate with a gap between said electrodes so that said electrodes are not electrically connected to each other; and forming a plurality of upper electrodes via respective dielectrics as a plurality of layers above said lower electrode, and connecting each of the upper electrodes to the external leader electrode or the lover electrode via an inclined extending portion inclined toward the external leader electrode and extending to the external leader electrode or the lower electrode and via a connecting section, wherein:
  forming dielectrics and upper electrodes comprises forming an inclined wall surface of each dielectric so that a wall surface of the dielectric located immediately below each upper electrode facing the inclined extending portion inclines toward the external leader electrode from a side that faces a bottom surface of the upper electrode toward a side that faces a top surface of said external leader electrode or said lower electrode, said inclined wall surface of each dielectrics being formed to have at least partly a portion extending from a lower end to an upper end thereof at an inclination between 0.1 and 20° with respect to the top surfaces of said external leader electrode and said lower electrode.

34. A method of manufacturing a capacitor, comprising:
forming an external leader electrode connecting to an upper electrode and a lower electrode on a flexible substrate with a gap between said electrodes so that said electrodes are not be electrically connected to each other;
filling the gap between said external leader electrode and said lower electrode with an insulator made of a first material and;
forming a dielectric made of a second material to extend over a top surface of said external leader electrode, a top surface of said lover electrode and a top surface of the insulator, wherein said first and second materials are different from each other; and
forming an upper electrode on the top surface of the dielectric and electrically connecting the upper electrode to the external leader electrode.

35. A method of manufacturing a capacitor, comprising:
forming an external leader electrode connecting to an upper electrode and a lower electrode on a flexible substrate with a gap between said electrodes so that said electrodes are not electrically connected to each other;
forming a dielectric to extend over a top surface of said external leader electrode and a top surface of said lower electrode; and
forming an upper electrode on the dielectric and electrically connecting the upper electrode to the external leader electrode, wherein:
  forming dielectrics and upper electrodes comprises forming each end surface facing said gap between said external leader electrode and said lower electrode to incline relative to a top surface of the flexible substrate, and, at the same time, forming an inclined end surface of said external leader electrode and an inclined end surface of said lower electrode so each have at least partly a portion extending from a lower end to an upper end of the inclined end surface at an inclination between 0.1 and 20° with respect to the top surface of the flexible substrate, and
  said dielectric and said upper electrode are formed along the inclined end surfaces of said external leader electrode and said lower electrode.

36. A method of manufacturing a capacitor, comprising:
forming an external leader electrode connecting to an upper electrode and a lower electrode on a flexible substrate with a gap between said electrodes so that said electrodes are not electrically connected to each other;
filling insulators into two corners to form inclined wall surfaces, said two corners being located between an end surface portion of said external leader electrode and the flexible substrate and between an end surface portion of said lower electrode and the flexible substrate, respectively, each said end surfaces facing said gap, and forming said filled insulators to have at least partly a portion extending from a lower end to an upper end of the inclined surface, said portion having an inclination between 0.1 and 20° with respect to a top surface of said flexible substrate and an inclination of ±20° with respect to top surfaces of said external leader electrode and lower electrode;
forming a dielectric to extend over a top surface of said external leader electrode and a top surface of said lower electrode; and
forming an upper electrode on the dielectric and electrically connecting the upper electrode to the external leader electrode.

37. A method of manufacturing a capacitor, comprising:
forming an external leader electrode connecting to a lower electrode on a flexible substrate;
forming external leader electrode connecting to an upper electrode on the flexible substrate;
forming an insulator in a corner between an end surface portion of the external leader electrode connecting to the lower electrode and said end surface on said flexible substrate, the insulator being formed to have an inclined end surface at an angle between 0.1 and 20° with respect to the flexible substrate;
forming an insulator into a corner facing the end surface portion of said external leader electrode connecting to the lower electrode on said flexible substrate, said insulator being famed to have at least partly a portion extending from a lower end to an upper end of an inclined surface of the insulator and having an inclination between 0.1 and 20° with respect to a top surface of said flexible substrate and an inclination of ±20° with respect to a top surface of said external leader electrode connecting to the lower electrode;

forming a lower electrode to extend across a the end surface portion of said external leader electrode connecting to the lower electrode, the inclined surface of said insulator, and an external exposed surface of the flexible substrate;

forming a dielectric on the lower electrode; and forming an upper electrode located opposite the lower electrode and extending across the dielectric and electrically connected to said external leader electrode connecting to the upper electrode.

\* \* \* \* \*